(12) United States Patent
Holland et al.

(10) Patent No.: US 10,291,925 B2
(45) Date of Patent: May 14, 2019

(54) TECHNIQUES FOR HARDWARE VIDEO ENCODING

(71) Applicant: Intel Corporation, Santa Clara, CA (US)

(72) Inventors: James M. Holland, Folsom, CA (US); Srinivasan Embar Raghukrishnan, Folsom, CA (US); Lidong Xu, Beijing (CN); Fangwen Fu, Folsom, CA (US); Dmitry E. Ryzhov, Mountain View, CA (US); Satya N. Yedidi, Roseville, CA (US)

(73) Assignee: Intel Corporation, Santa Clara, CA (US)

( * ) Notice: Subject to any disclaimer, the term of this patent is extended or adjusted under 35 U.S.C. 154(b) by 36 days.

(21) Appl. No.: 15/663,134

(22) Filed: Jul. 28, 2017

(65) Prior Publication Data
US 2019/0037227 A1   Jan. 31, 2019

(51) Int. Cl.
*H04N 7/12* (2006.01)
*H04N 11/02* (2006.01)
(Continued)

(52) U.S. Cl.
CPC ........... *H04N 19/43* (2014.11); *H04N 19/115* (2014.11); *H04N 19/126* (2014.11); *H04N 19/192* (2014.11); *H04N 19/53* (2014.11); *H04N 19/557* (2014.11); *H04N 19/567* (2014.11); *H04N 19/61* (2014.11); *H04N 19/96* (2014.11); *H04N 19/625* (2014.11)

(58) Field of Classification Search
CPC .... H04N 19/43; H04N 19/557; H04N 19/192; H04N 19/96; H04N 19/61; H04N 19/115; H04N 19/567; H04N 19/53; H04N 19/126; H04N 19/625
USPC ........................................ 375/240.01–240.29
See application file for complete search history.

(56) References Cited

U.S. PATENT DOCUMENTS 6,097,832 A  *  8/2000  Guillotel ............. H04N 7/0157
                                                 348/E7.007
6,968,008 B1    11/2005  Ribas-Corbera et al.
(Continued)

OTHER PUBLICATIONS

Holland et al., U.S. Appl. No. 15/483,146, filed Apr. 10, 2017, US Application, Drawings, and E-Ack Receipt attached 47 pages, not yet published.
(Continued)

*Primary Examiner* — Jared Walker
(74) *Attorney, Agent, or Firm* — International IP Law Group, P.L.L.C.

(57) ABSTRACT

An apparatus of video encoding is described herein. The apparatus includes an encoder and a hardware bit packing unit. The encoder includes a fixed function hierarchical motion estimation search unit, fixed function integer motion estimation search units, and a fixed function check and refinement unit. The check and refinement unit is to generate residuals using nested loops based on at least one spatial domain prediction and at least one frequency domain prediction and perform a final mode decision based on rate distortion optimization (RDO) costs associated with the generated residuals. The hardware bit packing unit is to pack bits as coded according to the final mode decision into a data format.

25 Claims, 8 Drawing Sheets

(51) Int. Cl.

| | | |
|---|---|---|
| *H04N 11/04* | (2006.01) | |
| *H04N 19/43* | (2014.01) | |
| *H04N 19/53* | (2014.01) | |
| *H04N 19/567* | (2014.01) | |
| *H04N 19/115* | (2014.01) | |
| *H04N 19/61* | (2014.01) | |
| *H04N 19/126* | (2014.01) | |
| *H04N 19/96* | (2014.01) | |
| *H04N 19/192* | (2014.01) | |
| *H04N 19/557* | (2014.01) | |
| *H04N 19/625* | (2014.01) | |

(56) References Cited

U.S. PATENT DOCUMENTS

| | | |
|---|---|---|
| 6,981,119 B1 | 12/2005 | Lepak et al. |
| 7,551,673 B1 * | 6/2009 | Oh .................. H04N 19/56 348/413.1 |
| 7,656,561 B2 | 2/2010 | Molgaard et al. |
| 8,149,915 B1 | 4/2012 | Novotny et al. |
| 8,934,544 B1 | 1/2015 | Wang |
| 9,398,297 B2 | 7/2016 | Gupta |
| 10,068,309 B2 | 9/2018 | Fries et al. |
| 2003/0229719 A1 | 12/2003 | Iwata et al. |
| 2004/0111627 A1 | 6/2004 | Evans et al. |
| 2005/0276496 A1 | 12/2005 | Molgaard et al. |
| 2007/0110160 A1 * | 5/2007 | Wang .................. H04N 19/56 375/240.16 |
| 2012/0219064 A1 * | 8/2012 | Zheng ................ H04N 19/105 375/240.16 |
| 2013/0184007 A1 | 7/2013 | Hategan et al. |
| 2013/0266072 A1 | 10/2013 | Lee et al. |
| 2014/0126638 A1 | 5/2014 | Sievers |
| 2014/0205012 A1 | 7/2014 | Lee et al. |
| 2014/0286433 A1 * | 9/2014 | He .................. H04N 19/56 375/240.16 |
| 2015/0178077 A1 | 6/2015 | Srinivasan et al. |
| 2015/0264348 A1 | 9/2015 | Zou et al. |
| 2015/0276496 A1 | 10/2015 | Kellogg et al. |
| 2015/0279055 A1 | 10/2015 | Kaburlasos et al. |
| 2016/0225161 A1 * | 8/2016 | Hepper .................. H04N 5/145 |
| 2016/0283391 A1 | 9/2016 | Nilsson et al. |
| 2016/0353122 A1 | 12/2016 | Krajcevski et al. |
| 2017/0076419 A1 | 3/2017 | Fries et al. |
| 2017/0178594 A1 | 6/2017 | Hasselgren et al. |
| 2017/0256024 A1 | 9/2017 | Abraham et al. |
| 2017/0345121 A1 | 11/2017 | Seiler |

OTHER PUBLICATIONS

Notice of Allowance, List of References for related U.S. Appl. No. 15/412,397 dated Mar. 18, 2019, 9 pages.

* cited by examiner

300

400

600

TECHNIQUES FOR HARDWARE VIDEO ENCODING

BACKGROUND ART

A video stream may be encoded into a variety of video compression formats, or the characteristics of the stream may be changed. Characteristics of the video stream include, but are not limited to, the resolution and the bit rate of the video stream. Encoding may also be used when preparing the video stream for transmission between devices or components of computing devices.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
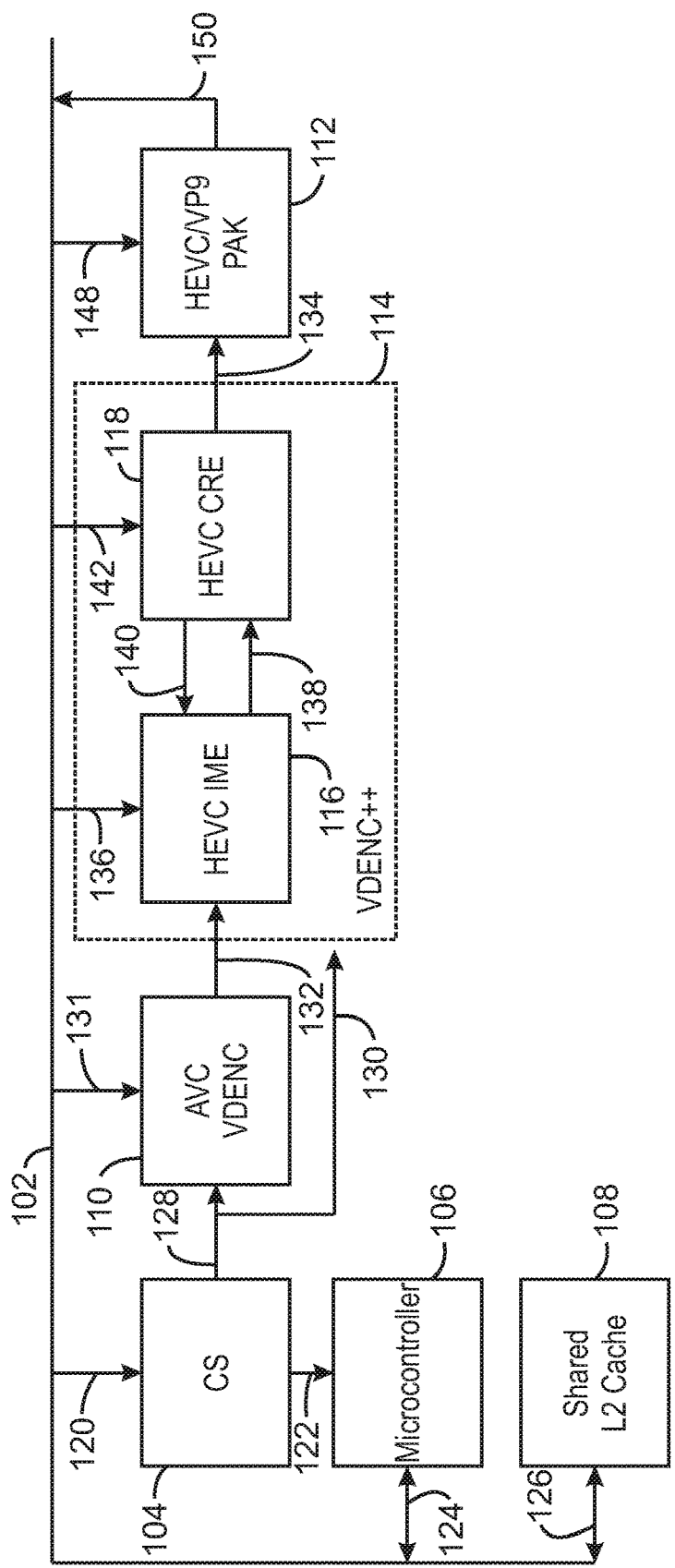
FIG. 1 a block diagram illustrating an example system for hardware video encoding.

Typical solutions for encoding video may employ multiple programmable engines running kernel programs that use hardware co-processors. In addition, video may also be encoded using hardware-based Advanced Video Coding (AVC)-class encoders. For example, such AVC-class encoders may encode video according to the ISO/IEC 14496-10—MPEG-4 Part 10, Advanced Video Coding Specification, published May 2003. However, existing hardware AVC-class encoders may either exclude or reduce the importance of rate distortion optimization for various reasons.

The present techniques include multiple techniques for improving the performance, quality, and extensibility of hardware video encoders. In embodiments, the present techniques improve an encoder that is without programmable engines executing the main loop of the encoder algorithms, so-called fixed function encoding. Fixed function encoding may be used, for example, in phones, tablets, computers, cameras, cars, game systems, and so on to perform a host of encoding tasks for real-time compression of pixels for any number of reasons. The present techniques include, but are not limited to, the following algorithms and techniques. First, a core algorithm for motion estimation, mode decision, rate distortion optimization loops, merge tapering for additional candidate generation, rate distortion optimization (RDO) estimation of coefficients and scan complexity, and largest coding unit (LCU)-based neighbor reconstruction, is provided. Second, various subjective quality enhancements, including a Residual Flatness Check for sample adaptive offset (SAO) substitution to handle large transform unit (TU) artifacts, per coding unit (CU) quantization parameter (QP) adjustments based on motion length, automatic weighted prediction parameter generation, and variable direction intra refresh period with guardband protection, are also provided. Third, enhanced statistics including sum of square error classifier cubes are provided. Fourth, multi-codec support with VP9 and dynamic VP9 scaling support, supporting 4:2:2 and 4:4:4 chroma formats with 10 bits and 12 bits of precision optimally for compression and bandwidth based on 4:2:0 8 bit fundamental building blocks is described. Finally, techniques specific to hardware considerations such as performance and bandwidth improvements are provided. For example, the techniques include reconfigurable pipeline decision dependency handling enabling multiple performance modes, tile-based scalability for increased performance from multiple pipelines, PAK only multi-pass without performing motion estimation and mode decision for small frame or tile quantization parameter (QP) changes, and variable register transfer logic (RTL) cache capacity declaration pairing with column tile width walking patterns.

The techniques described herein thus enable High Efficiency Video Coding (HEVC)-class video encoding to be implemented using hardware. For example, the techniques describe herein may be used to encode video according to the second version of the HEVC standard, published May 2015, or version 0.6 of the VP9 Bitstream and Decoding Process Specification, published Mar. 31, 2016. Previous standards treated "macroblocks" as statically sized elements, while in newer tree recursive codecs, the encoder can evaluate when a pixel block should be split into finer "coding units" (CUs) or be made into larger CUs depending on many factors ultimately yielding the lowest bit cost with the highest visual quality. Additionally, previous standards treated each macroblock with a uniform prediction type (such as inter or intra prediction types) and uniform transform size (such as 8×8 or 4×4) while high efficiency standards allow for mixing of prediction types and mixing of transform sizes, both based on the encoder decision process. By contrast, the coding units of the present techniques are dynamically sized and may include any combination of different prediction types. Thus, the rate distortion optimization of HEVC-class encoding may be used to achieve significant compression gains over AVC-class encoders, including software or hardware based encoders. Such a hardware implementation may provide better power and performance over software-based solutions. The techniques thus enable real-time HD and 4 K encoding on devices with limited processing capabilities, such as mobile devices. Moreover, the techniques may provide compatibility with multiple recursive-based codecs and multiple formats using a singular engine.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the inventions. The various appearances of "an embodiment," "one embodiment," or "some embodiments" are not necessarily all referring to the same embodiments.

FIG. 1 a block diagram illustrating an example system for hardware video encoding using a three stage motion estimation. The example system is generally referred to using the reference number 100 and can be implemented in the electronic device 700 of FIG. 7 below. For example, the system 100 may be implemented using the encoder 718 and microcontroller 725 of the electronic device 700.

The system 100 includes a memory/cache interface 102 that is communicatively coupled to a command streamer (CS) 104, a microcontroller 106, a shared L2 cache 108, a video encoder AVC VDENC 110, an HEVC/VP9 hardware bit packer (PAK) 112, and an enhanced video encoder VDENC++ 114. The enhanced video encoder VDENC++ 114 further includes an HEVC integer motion estimator 116 and an HEVC check and refinement engine (CRE) 118.

As shown in FIG. 1, the CS 104 may receive a set of commands 120 from the memory/cache interface 102 and send information 122 to the microcontroller 106. For example, the CS 104 may be a buffer in memory that software running on the host CPU or microcontroller can use to inject command buffers to the hardware fixed function. For example, a host may advance a head pointer, while the hardware consumes the commands and advances the tail pointer. The hardware cannot advance the tail pointer beyond the head pointer and the software cannot advance the head pointer beyond the tail pointer. In some examples, the information 122 may include commands used to control whether a second pass is to be executed or not based on rate control analysis. For example, as the CS 104 is the unit in charge of dispatching jobs, the CS 104 may dispatch the job again based on microcontroller stats, before proceeding to next job. The microcontroller 106 may send and receive information 124 to and from the memory cache interface 102. For example, the information 124 may include statistics such as microcontroller statistics, video encoder statistics, PAK statistics, and conditional pass flag statistics, as described in FIG. 4 below. The shared L2 cache 108 may also send and receive information 126 to and from the memory/cache interface 102. For example, the information 126 may include shared pixels between video encoder 114 and the PAK 112. For example, if the video encoder 114 load a given block of pixel data, then PAK 112 may not have to load the block of pixel data from memory when it comes time to perform a PAK on a given LCU\CU, etc. The PAK 112 may access the particular block of pixel data from the shared L2 cache 108 instead of a slower memory. The CS 104 may send a state 128 to the video encoder 110 and a state 130 to the enhanced video encoder 114. For example, the states 128 and 130 may be control information, such as frame or tile type, target QP, various enables/disables based on application controls, etc.

The video encoder 110 may also receive video 131 from the memory/cache interface 102 in addition to the state 128. For example, video or other sequences of visual images may be presented as a series of frames or tiles or sets of pixels. As used herein, a tile refers to a mosaic pattern that fills a whole frame. A frame may thus be composed of many tiles potentially. Each individual tile can be repeated before proceeding to the next tile to increase efficiency in scenarios where a scene change may have occurred. For example, rather than waiting for a whole frame to be improperly encoded on scene changes, at the completion of the first tile the encoder can repeat just that one tile and update the future tiles to be aware the scene change occurred. If there are 4 tiles per frame, this may take 1.25×the time of 1 frame whereas frame based repetition may take 2×, assuming the first tile detected the misprediction and was repeated.

In some examples, each tile can be decoded independently. For example, in HD vs UHD resolutions, of 1920×1080 or 3840×2160 up to 7680×4320, respectively, without the use of tiles, a decoder may have to decode 7680 pixels wide before advancing to the next row of LCU's. This may put pressure on the decoder to hold a large amount of temporary information that could be referenced by the next row. In some examples, the frame can be split into 8 tiles, each 1920 wide and still 4320 tall. This means the decoder can decode the frame like a newspaper column strip before moving to the next column. Tiles can also be used to reduce the height of a frame as well. If we specify a tile to be 1920×1080 in size, a 7680×4320 frame would include 4×4 tiles (4×1920 by 4×1080=7680×4320). However, in some examples, the tile size can also be set to the frame size, resulting in 1×1 tiles. The video encoder 132 can perform two stages of motion estimation. Motion estimation can be used to exploit the redundancy between adjacent frames or tiles to achieve compression by selecting a frame or tile as a reference frame or tile and predicting subsequent frames or tiles from the reference frame or tile. The prediction may be described by a plurality of motion vectors. In particular, the video encoder 132 may perform a hierarchical motion estimation search and an integer motion estimation search on the received frames or tiles. In motion estimation, the current frame or tile in a sequence of frames or tiles is predicted, usually from at least one reference frame or tile. In some examples, the movement of objects in a sequence of frames or tiles can be analyzed to obtain vectors that represent the estimated motion of the objects between frames or tiles. In embodiments, each frame or tile can be divided into coding units (CUs), and the motion vectors represent the change in position of a CU between frames or tiles. A CU may be an adjustable block of pixels. For example, a CU may be a block of pixels sixteen by eight pixels in size.

A current frame or tile may thus be divided into CUs such that each CU is compared to a region in the reference frame or tile of the same size using an error measure, and the best matching region is selected. The search is conducted over a search area. A motion vector denoting the displacement of the region in the reference frame or tile with respect to the CU in the current frame or tile is determined. In some examples, the video encoder 110 can use multiple reference frames or tiles as downscaled references which are searched to provide candidates for a full resolution IME search. For example, the IME may be performed to find a temporal match. Moreover, motion estimation of subsequent blocks can be made prior to a complete mode decision being made on a previous block. Such a motion estimation is made as a heuristic of an approximate or pseudo prediction, which may violate the precise decoder specification but may be close enough for the encoder and encoding decisions in the majority of CUs. The prediction mode may also determine the number of passes made to compress the current frame or tile size into a target frame or tile size. The video encoder 110 may then output one or more search centers 132 to be refined by the enhanced video encoder 114 and used to generate PAK coding unit (CU) objects 134 sent to the HEVC/VP9 PAK 112 for encoding the video frame. Thus, the VDENC++ 114 can be included in a system to enable HEVC/VP9 class hardware encoding of video.

The enhanced video encoder VDENC++ 114 may include a third stage of motion estimation, the HEVC IME 116. As described in greater detail below with respect to FIGS. 2 and 3, the HEVC IME 116 can generate shape candidates 138 and receive predicted motion vectors 140 from the HEVC CRE 118. The HEVC CRE 118 can perform a number of functions. For example, the HEVC CRE 118 can perform skip checks, fractional motion estimation, bi-directional motion estimation, intra-frame angular prediction, and mode decision making. A skip check may be a spot check of a specific location of a previous frame or tile to see how well the specific location matches a predicted motion vector. The skip check may be used to determine when encoding for a CU should be skipped, such that no vector information for a given CU is generated. The skip check is confirmed when the current CU follows the same motion pattern as the neighboring CUs, whether they are static or following a translation motion. In the case of a skip, no information may be generated for the associated CU.

In some examples, the HEVC CRE 118 can perform a fractional motion estimation (FME) based on the image frame or tile and/or partition information. For example, selected CU candidates with their motion vectors can be further searched in the fractional motion resolution. After partitioning, the resulting motion vectors may be at an integer resolution. For example, the motion vectors for each CU shape may be per pixel. Various coding specifications may specify resolutions halfway between pixels or even quarter resolutions between pixels to be more precise. For example, an object moving from frame to frame or tile to tile may not move a whole pixel between the two frames or tiles. Instead, it may move only half a pixel. Thus, a half fractional resolution may enable such motion to be captured. In some examples, the motion vectors can be encoded and stored or transmitted to a decoder.

In some examples, the HEVC CRE 118 can perform bidirectional motion estimation. For example, the HEVC CRE 118 may locate an object in both future and past frames or tiles and blend the two of them together to average the predicted results. Thus, the resulting predicted motion vectors may be more accurate than either a motion vector predicted solely on a past frame or tile or a motion vector predicted solely on a future frame or tile. In some examples, the frames or tiles can be re-ordered differently from the display order. For example, if a display order for 5 frames is 0,1,2,3,4, then the frames can be encoded in the order 0,2,1,4,3 (or IPBPB in this example). Frames 1 and 3 can predict from the past (0) and the future (2). Such a reordering may produce better compression in most cases.

In some examples, the HEVC CRE 118 can perform intra-frame or intra-tile prediction. For example, a scene change or other major change may have occurred such that the object does not exist in any past frame. Thus, the motion vectors must be predicted entirely from pixels from within the frame. The HEVC CRE 118 can analyze pixels above and to the left of each pixel, and select an angle in which the pixels can be copied. For example, horizontal patterns may be copied horizontally and vertical patterns may be copied vertically. In some examples, there may be a number of predetermined angles between the horizontal and vertical axes to select from. For example, a higher performance mode may include searching with less IME predictor candidates. In some examples, normal performance may be a balance of quality and execution time of given frame. A higher performance mode may reduce the execution time at the cost of some quality. A lower performance mode may increase the quality while also increasing the execution time. In some examples, the HEVC CRE 118 can check all 35 angles in both normal and lower performance modes (providing higher quality), but may reduce the angles searched in higher performance (lower quality) for some CU levels. For example, the HEVC CRE 118 can reduce the angles for 32×32 CU only, and not 16×16 or 8×8, and continue to search all angles there.

In some examples, for the IME search, a normal performance mode of the HEVC IME 116 may use 8 candidates. In a high performance mode, the HEVC IME 116 may use only 4 candidates for the IME search to save time by performing less calculations. In a higher quality or lower performance mode, the HEVC IME 116 may search 12 candidates for the IME search.

In some examples, for the HME search, in a normal performance mode, the AVC VDENC 110 may only consider one reference frame. In a higher quality mode, the AVC VDENC 110 may consider more than one reference frame.

In some examples, support may be provided for multiple codecs, including the VP9 codec in particular. For example, HEVC and VP9 are different in the skip and collocated motion vector (MV) list. For example, only the nearest neighbor is considered for VP9. Since VP9 also uses different transform and quantization methods, the RDO computation described below may need to consider 0-255 quantization steps. Furthermore, a different transform matrix may be used. In addition, a bit rate estimation may be based on probability. Neighbor pixels smoothing may also be disabled for VP9. Additionally, a MPM list derivation, mode mask, partition mask, may be provided for VP9 support. In some examples, intra true motion support may also be included for 4×4, 8×8, 16×16, 32×32 and non-square shapes. Non square intra prediction may also be provided for 16×8/8×16, 32×16/16×32, 8×4/4×8 shapes. Furthermore, reference frame size scaling may be provided on the fly when executing motion searches.

The type of prediction made for each frame may be referred to as a mode decision. For example, the HEVC CRE 118 can encode frames based on any of the four types of prediction, including skip checks, fractional motion estimation, bi-directional motion estimation, intra-frame motion estimation. To determine the particular encoding mode, the HEVC CRE 118 can make a mode decision based on the motion estimation. In particular, the output of motion estimation may be used to determine an encoding cost of each different modes that might be applied to encode the current image frame. This may result in selection of the mode that exhibits least cost in one implementation. In some examples, the HEVC CRE 118 may choose a mode that is a closest match to the original image and consumes the least amount of bits to transmit in the bit stream. For example, the four modes of prediction may result in a closely matching image, but one of the prediction modes may consume less bits than the rest. The HEVC CRE 118 may thus use the prediction mode resulting in less bits. In some examples, the HEVC CRE 118 may base the mode decision on a rate distortion optimized (RDO) cost. For example, the RDO cost may be calculated by a forward transform and quantization (FTQ) module (not shown) based on candidates that were derived by the CRE 118. In some examples, the FTQ module may calculate the RDO cost using a discrete cosine transformation (DCT) and a quantization. The FTQ module may also estimate the amount of bits used to transmit a block based on an amount of error to correct.

In some examples, the HEVC CRE 118 can compare different combinations of coding units based on their combined RDO costs. For example, a 16×16 coding unit may be compared to any combination of four 8×8 coding units. Likewise, differently estimated 32×32 coding units may be compared with different combinations of 4×4 coding units. Similarly, a 64×64 coding unit may be compared with various combinations of four 32×32 coding units, as described in greater detail with respect to FIG. 3 below. The HEVC CRE 118 can then make a final decision as to which coding units or largest coding units to send to the PAK.

The prediction mode may also determine the number of passes made to compress the current frame size into a target frame size. In some examples, the target frame size may be determined by an application or driver. In some cases, several passes are made to determine if the current frame size is equal to the target frame size, wherein a pass is a single iteration through a portion of the encoder that is used to achieve the target frame size. The target frame size may be specified by a rate control module (not shown). In some examples, the number of passes to bring the current frame to the size of the target frame is limited by the mode for each frame. With each pass, a quantization parameter may be modified to achieve the target frame size.

The PAK 112 can generate a statistics stream 150. The statistics stream can include various parameters that are gathered during encoding and can be returned to memory for use by another process or to tune the encoder further for better compression or quality. For example, the statistics from the PAK 112 may include the actual bit amount of bits used to transmit a CU. In some examples, the statistics stream 150 may include sum of square error (SSE) classifier cubes. For example, a final accurate SSE between the source and decoded picture can be generated in the PAK 112 and classified into various groups for faster software analysis by the microcontroller 106. In some examples, this binning can be performed by marking low and high thresholds of the SSE based on motion vector length of inter CUs or intra distortion, and specific regions-of-interest in the frame. In some examples, the microcontroller 106 may have a frame re-encoded in response to detecting an error beyond a threshold. In some examples, the microcontroller 106 may specify an adjustment value for a prediction parameter for future frames to be encoded with less error in response to detecting an error below a higher threshold but greater than a lower threshold. In some examples, an application can specify an adjustment value for tuning the thresholds. For examples, some applications may be more tolerant while some other applications may be stricter. In this way, the thresholds may be tuned to support more usages than if the thresholds were set at a static value.

In addition, the PAK can generate reconstructed video frames to be used for motion estimation. The reconstructed frames can be saved to memory, such as the shared L2 cache 108. In some examples, the 10 bit or 12 bit input can be truncated to the 8 most significant bits (MSB) in the source and the reconstructed image can be written to the memory 108 in a split format sending the 8 bit MSB to one region of memory 108 with the 2 bit or 4 bit of least significant bits (LSB) to another region of memory 108. This allows the motion estimation to use only the 8b MSB for searching while the 10b and 12b original values can be used in the motion compensation of PAK substantially reducing bandwidth and increase quality on noisy content.

As illustrated, the PAK 112 receives and transmits data to/from the memory/cache interface 208. In some examples, the shared L2 cache 108 may be a shared cache between the encoding process performed by AVC VDENC 110 and VDENC++ 114, and the PAK 112. Video encoding may include both motion estimation and motion compensation. Motion estimation is the process of searching for a best motion vector. Motion compensation is the process of taking a specified motion vector and then predicting pixels at the location of the motion vector that can then be used for encoding. Each of the encoding components 110, 116, 118 and 112 may receive pixels to be processed as indicated by arrows 131, 136, 142, and 148, respectively. Specifically, the encoding process loads pixels for searching and determining the motion vectors, and the PAK 112 processes pixels to apply motion to the location specified by the motion vectors. The shared L2 cache 108 is a common cache that the processes can access to read/write data. Thus, in some examples, when data is first loaded for encoding, those pixels remain in the shared L2 cache 108 long enough for the PAK process 112 to find each specific pixel needed for motion compensation. In some examples, this shared L2 cache 108 thus prevents loading and transmitting the pixels twice. In some examples, the shared L2 cache 108 may include variable register transfer logic (RTL) cache capacity declaration pairing with column tile width walking patterns. In some examples, where memory bandwidth must be minimized and an on-chip cache must be minimally sized, a tile-width cache can be used instead of a frame-width cache.

FIG. 1 does not show various costings that can be applied to each decision made by the AVC VDENC 110, the HEVC IME 116, and the HEVC CRE 118. A software driver may have information that is used to override any of the functions described above through costings. Moreover, the microcontroller 106 may also have information that is used to override any of the functions described above through costings. In some examples, the costings may be weights and controls that are used to essentially bias decisions throughout the process. For example, in the HEVC CRE 118 various candidate motion estimations may be compared with skip candidates. In some cases, the raw numbers that are derived and used for the comparison may result in a coding unit that would not be selected when information is available that could influence the coding unit choice. In some examples, some a priori knowledge or pre-determined values may suggest if the three candidates are close, then always take the skip as the best choice. These costings result in a programmable weight from some other source. The costings can be then distributed to bias decisions and selections at each search or decision. The costings enable a high degree of programmability with each searching function, even when fixed function hardware units are used. Thus, the present techniques enable a high degree of reusability for different applications.

In some examples, the costings can be used to create a re-configurable encoding pipeline. For example, various costings and/or parameters can be used to bias the mode decisions during encoding. Parameters such as the quantization parameter (QP) can be adjusted to bias the mode selection based on different content types, available bandwidth, resolution, targeted codec and bit budgets. In embodiments, for subjective video optimization, each QP can be adjusted for each CU individually to promote quality in some cases and hide visual artifacts in regions that are less visible. Put another way, the QP as a costing enables a direct control feedback loop where by changing the QP bias up or down, the present techniques can very clearly improve how the user perceives a video quality by increasing artifacts where the user is not looking and decreasing artifacts where the user is looking. Multiple stages of user programmable thresholds can be used to control the QP. A Stage1 QP can be based on the relative distortion of this block to the rest of the frame in quartiles. Each quartile may have its own change in QP or deltaQP. A Stage2 QP can be based on mode specific information, such as the intra-prediction mode type or the motion vector length for inter-prediction. A Stage3 QP can be based on a user-specified region of interest map with multiple levels of associated deltaQPs. Each delta may be combined and clamped if necessary before and after combination with the sliceQP.

In cases where a integer QP value produces a frame that significantly exceeds a target bit budget and one QP higher integer value produces a frame that significantly undershoots the target bit budget, a fractional precision QP between the two nearest integer QP values may be used and the lower and higher integer QP values may be proportionally assigned throughout the frame so that the average of the CU QP for the entire frame allows for more accurate results to meet the target bit budget with a lesser amount of overshoot and undershoot.

In some examples, quantization parameter is a value that is used to divide the coefficients of the current frame in order to obtain values for the target frame size. A higher quantization parameter may result in more zero coefficients that do not have to be encoded to reduce the bitrate at the expense of quality. Accordingly, the frames may be sized in such a manner that the number of bits per frame comports with the bit rate of the encoding format of the target video stream. In some cases, an encoder may perform motion estimation again to determine the finer motion vectors and CU types of the frames after the bit rate control has been applied to each frame. In some examples, an additional fourth stage can make per coding unit adjustments based on motion length. For example, a motion can be classified as static motion, low motion, or high motion. Because the human visual system may be more sensitive to artifacts on static objects than objects with high motion, the QP can be decreased in areas of static motion or low motion, and increased in areas of high motion, respectively, to blur details and enhance encoding accordingly.

Once new motion vectors, quantization parameters, and CU types have been determined, the HEVC PAK 112 may encode the frames into a final compressed video stream in the target video compression format.

The diagram of FIG. 1 is not intended to indicate that the example system 100 is to include all of the components shown in FIG. 1. Rather, the example system 100 can be implemented using fewer or additional components not illustrated in FIG. 1 (e.g., additional motion estimators, feedback loops, microcontrollers, etc.). For example, the VDENC++ may also include separate modules for FTQ and a final decision module (not shown) separate from the HEVC CRE 118 to make final decisions regarding units.

Figure 2:
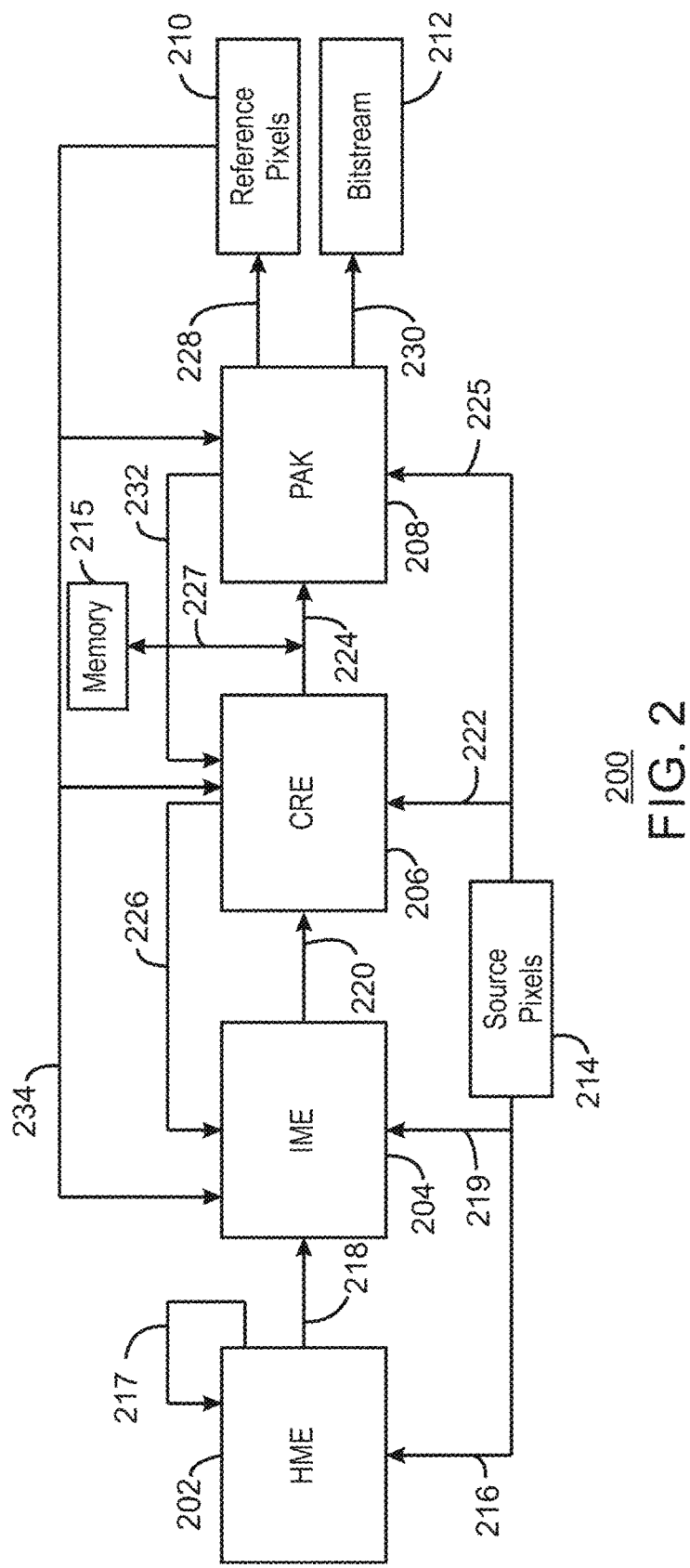
FIG. 2 is a block diagram illustrating an example pipeline for hardware video encoding.

FIG. 2 is a block diagram illustrating an example pipeline for hardware video encoding. The example pipeline is referred to generally by the reference number 200 and can be implemented in the system 100 of FIG. 1 above, or the electronic device 700 below in FIG. 7 using the method 600 of FIG. 6 below. The pipeline 200 includes multiple stages including a hierarchical motion estimation (HME) search stage 202, an integer motion estimation (IME) search stage 204, a check and refinement engine (CRE) stage 206, and a hardware bit packing (PAK) stage 208. For example, the HME search stage 202 may be implemented via the video encoder AVC VDENC 110, the IME search stage 204 may be implemented via the HEVC IME 116, the CRE stage 206 may be implemented via the HEVC CRE 118, and the PAK stage 208 may be implemented via the HEVC/VP9 PAK 112 of FIG. 1 above. The output of the PAK stage 208 may be reference pixels 210 and a bit stream 212. In addition, FIG. 2 includes a set of source pixels 214.

At block 202, a hierarchical motion estimation (HME) search may be performed to obtain multiple references. In embodiments, the HME 202 may be performed on each subsequent frame in order to determine the motion vectors for each frame. An HME search involves performing coarse searches for motion vectors for each frame to determine an estimated motion vector for each CU within the frame based on a previous frame. For example, when a first I-frame is analyzed, no HME search may be performed as there is no previous frame. At that time, the source pixels 216 may be downscaled so that way when the next frame is encoded, the downsampled pixels 217 may become the reference that is compared to the source 216 for motion estimation. The reference 217 may thus be used from the third frame onward. Thus, the source pixels 216 may be internally downsampled by the HME 202 and written and read back as indicted by feedback loop 217 for future use as a downsampled reference. The initial estimated motion vectors may be refined by performing additional searches at a finer level of granularity. For example, the CUs may be searched at various resolutions, from coarse to fine levels of granularity, in order to determine the motion vectors. Other HME searching techniques may include, but are not limited to, changing the size of the CUs when searching for motion vectors.

In embodiments, bit rate control may be applied to each frame in order to create frames that meet the frame size of the encoding format of the target video stream. The various video compression formats use a stated bit rate for a video stream, and the bit rate is the number of bits per second that are present when the video is played. Bit rate control is done by determining the ideal quantization parameters for the frame to result in the target frame size.

In some examples, the HME search stage 202 may take as input a full resolution CU and scale down the resolution to a fourth, an eighth, or higher resolution. The HME motion estimation can then be performed with the scaled down resolution. For example, the full resolution of the input CUs may be 64×64 pixels, and the scaled down resolutions may be 32×32, 16×16, and 8×8 pixels. This results in a performance advantage when compared to performing the HME search at full resolution, which may be very power performance intensive. In some examples, the HME can be performed using two references. For example, the two references may be the two frames that immediately precede a current frame. In other embodiments, the two references may be a previous frame and a long term reference frame.

As used herein, a long term reference frame is a high quality encoded frame that was processed within a predetermined number of frames ago. For example, the long term reference may be a very good quality encoded frame from 100 frames ago. In some examples, a predetermined number of candidates may be considered for motion estimation. For example, the number of candidates may be set at sixteen candidates. In some examples, the HME search 202 may include two stages. For example, the first HME stage may be more downscaled that the second HME stage. The second HME stage may receive predictors from the first HME stage. In this way, the number of stages may be increased to reduce lost details due to larger downscaling using less stages. The output of the HME search 202 may be HME predictors 218. For example, the HME predictors may be a pair of reduced precision motion vectors. The HME predictors 218 may be good guesses on where to search for a match, as analyzed from downsampled source pixels 216.

The integer motion estimator (IME) 204 may perform a full search using the HME predictors 218, source pixels 219, and reference pixels 234 from the PAK 208. For example, the IME 204 can use a reduced precision motion vector found during the dual HME search to obtain a precise motion vector. The IME 204 can compare all values of various block sizes for the coding units of the current frame recited from source pixels 214 with that of integer pixels in a search area of a reference image frame from reference pixels 234.

In some examples, the IME may use up to 12 40×40 search windows or predictors. In some examples, the IME may use four predictors, or any other number of predictors based on a performance mode. For example, a higher performance mode may select two spatial neighbors and two HME predictors, while a normal performance mode may be able to include four or more additional predictor candidates.

At block 206, the check and refinement engine (CRE) may partition the CU into pixel coding units using nested loops. For example, the partitioning may be based on a CU record 220 received from the IME 204. A CU record is an enumeration of every single shape within a CU, such as a 16×16 CU. Furthermore, some CU may be split into multiple Prediction Units (PUs) or Transform Units (TUs) that are more fine-grained within a CU. Various coding standards have multiple block sizes that could be selected such as 16×16, 8×8, 4×4s and so on. During the IME searches 204, some of the candidates found in the first full search can be combined with other candidates from the second full search. The CU record keeps track of the CU shapes and depending on the motion vectors found, some CUs can be combined via partitioning. The CRE may use the MB record when determining combinations of integer motion estimation to use for generating residuals to be transformed and scored for comparison as described in greater detail with respect to the example CRE pipeline of FIG. 3 below.

As indicated by a feedback loop from the CRE 206 to the IME 204, the CRE 206 may provide neighbor predictors 226 to the IME 204. The neighbor predictors 226 may be good guesses where to search for a match given what a preceding neighbor found as a good match. For example, the neighbor predictors may include cost centers and search centers. For example, the cost centers may be based on the AMVP and a merge list within the codec. The cost centers may represent the location closet matching to what the decoder would predict in a current block's motion vector by some combination of previously decoded neighbor motion vectors because a motion vector for the current block will be coded differentially to the predicted motion vector". For example, if a predicted motion vector is (10,−5), then (10,−5) may be marked as the center of the search for a motion vector that has the best match AND is close to that center. If, for example, (11,−5) is the best match, then the encoder can send (1,0) in the bit stream for the decoder to add to the predicted vector of (10,−5) to result at the correct location (11,−5).

At block 208, a hardware bit packing (PAK) unit is to pack bits corresponding to the source pixels 225 as coded according to the mode decision into a data format. For example, the data can be formatted according to a recursive video standard. Recursive video standards may include, but are not limited to, HEVC, VP9, etc. In embodiments, the results are binarized into the different video formats based on the encoder mode selection. As shown by arrows 228 and 230, the results of the PAK stage 208 may include reference pixels 210 and a bit stream 212, which can be accurately and uniquely decoded by following the video standard. The encoder mode selection may yield a plurality of mode decisions. A mode decision, as used herein, refers to how the encoder represents each CU. The encoder mode selection may be set to encode the least number of bits with the highest amount of quality. In some examples, the PAK may be set to encode at a 64×64 granularity. For example, in the case that a 64×64 block may be represented by a single bit, then a 64×64 granularity would be more efficient than a 32×32 granularity, which would require at least four bits. In some examples, the PAK may be set to encode at a 32×32 granularity. On the other hand, setting the PAK to operate at a 32×32 granularity may lower the time it takes for statistics to be generated by the PAK. In some examples, as shown by feedback loop 232, such statistics may be sent from the PAK 208 to the CRE 206 and used to improve prediction at the CRE 206. For example, the statistics may be used for a slice size conformance feature to predict when a current slice is to be closed and another slice started to align slice sizes to network packets. In some examples, the PAK may have an accurate bit stream size counter, while the ENC may have an approximate bit stream counter. Getting the feedback four times per 64×64 CU versus one time per 64×64 CU allows for more accurate slice size termination. In some examples, the reference pixels 210 may also be provided to the IME stage 204 as indicated by a feedback loop 234. For example, the IME stage 204 may compare a subsequent frame to the reference pixels 210 to find an appropriate block in the reference pixels 210. Thus, the reference pixels 210 may be used by the IME stage 204 to perform motion estimation as described above.

In some examples, the PAK 208 may also perform PAK only multi-pass without performing motion estimation and mode decision for small frame QP changes. For example, if multiple passes are needed to achieve a desired frame size by the bit rate control (BRC) algorithm, two options may be presented for a second pass. In the first option, the PAK 208 can redo the entire encoding based on the updated costings with the new QP. In the second option, the PAK 208 can bypass the encoding and replay the mode decisions from the first pass with a modified QP only using the PAK 208 hardware. For example, the PAK 208 may retrieve mode decisions saved to memory 215 as indicated by an arrow 227. The second option may save both power and time. In some examples, the first or second option may be selected based on a threshold level of frame QP changes. For example, the PAK may perform a PAK only multi-pass in response to detecting a frame QP change that is less than a first threshold and higher than a second threshold. Thus, the HME 202, IME 204, and CRE 206 may be bypassed and computing resources can be saved to increase precision by small amounts.

The diagram of FIG. 2 is not intended to indicate that the example pipeline 200 is to include all of the components shown in FIG. 2. Rather, the example pipeline 200 can be implemented using fewer or additional components not illustrated in FIG. 2 (e.g., additional stages, feedback loops, etc.). For example, while a dual reference HME search 202 is described, the HME search 202 may be performed using a plurality of reference frames resulting in a multi-reference HME search 202.

Figure 3:
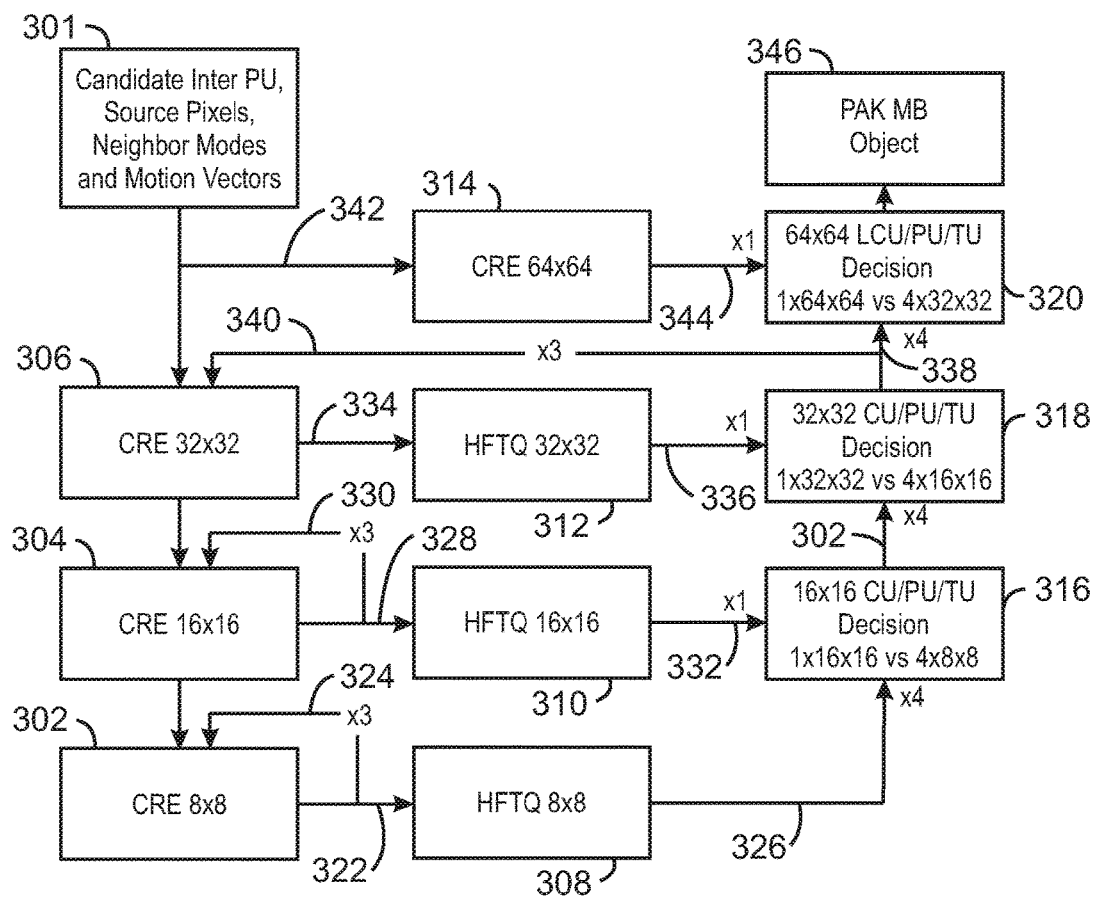
FIG. 3 is a block diagram illustrating an example pipeline with nested loops for determining coding units.

FIG. 3 is a block diagram illustrating an example pipeline with nested loops for determining coding units. The example pipeline is generally referenced using the reference number 300 and can be implemented in the HEVC CRE 118 of FIG. 1 above, or the encoder 728 of FIG. 7 below. In addition, the pipeline 300 may be compatible with multiple quad-tree based codecs. Thus, for example, the same single pipeline 300 may be used to efficiently encode video using either the HEVC or VP9 codec.

The example pipeline 300 is a recursive tree-based pipeline that includes a first column of CREs 302, 304, and 306 that may process different size CUs in parallel. The first column may be processed in an up-down direction as indicated by arrows. The pipeline 300 includes a second column of Hadamard Forward Transform and Quantization (HFTQ) modules 308, 310, 312 to generate RDO scores for a selected number of combinations of CUs, and a CRE 314 that processes full resolution CUs. A Hadamard Forward Transform is a simplified version of a Discrete Cosine Transformation (DCT). In some examples, either an HFT or DCT may be used for different gatecount cost. In some examples, the RD-cost may be computed without performing an inverse process (ITIQ). For example, the distortion in the rate distortion optimization may be calculated by subtracting the original pixels from the transformed and quantized, with the reverse done (ITIQ). In some examples, the distortion can instead be computed in the frequency domain, negating the costly ITIQ portion of a standard RDO implementation. In some examples, the RDO scores may be generated using a discrete cosine transformation (DCT) and a quantization as described in greater detail below. A third column of the pipeline 300 includes three coding unit decision blocks 316, 318, and 320. The third column of the pipeline 300 is processed down-up as indicated by arrows.

As shown in FIG. 3, a set of candidate inter prediction units (PUs), source pixels, neighbor modes, and motion vectors 301 may be received at the pipeline 300 and processed in parallel by three CRE blocks 302, 304, and 306. For example, the PUs may be 64×64 pixels. The PUs may be split into 8×8 pixel macroblocks to be processed by CRE 302, 16×16 pixel CUs to be processed by CRE 304, and 32×32 pixel CUs to be processed by CRE 306. Each of the CREs 302, 304, 306 may process the CUs using skip check, intra-frame motion estimation, fractional motion estimation, and/or bidirectional motion estimation. For example, CRE 302 may process four 8×8 CUs using a combination of these techniques as indicated by loop 324. Each of the techniques may be used to subtract pixels values from the original pixels in the spatial domain. For example, the predicted CU for each of the may be subtracted from the original CU to generate a processed CU, referred to herein as a residual. In some examples, the CRE 302 may process four 8×8 CUs in the same amount of time that it takes the CRE 304 to process one 16×16 CU. Similarly, the CRE 304 may process four 16×16 CUs in the same amount of time that a single 32×32 CU is processed by the CRE 306. In some examples, the four residuals may be sent to the HFTQ 308 for generating associated RDO scores for each of the processed CUs. For example, each of the residuals may be transformed by the HFTQ 308 from the spatial domain into the frequency domain. The HFTQ 308 may then consolidate which frequencies have the most energy and then quantize the frequencies. The RDO scores for the four residuals may be sent to the CU decision block 316 for comparison against a single 16×16 CU residual. For example, the CRE 304 may likewise generate four residuals to be sent to the HFTQ 310. The CRE 304 may generate four 16×16 CU residuals as indicated by loop 330. The HFTQ may generate RDO scores for each of the residuals and send the RDO for each 16×16 CU residual to be compared against the combined RDOs of four 8×8 CU residuals at the coding unit/prediction unit/transform unit (CU/PU/TU) decision block 316. The CU decision block 316 may make four comparisons and corresponding decisions resulting in four 16×16 coding units to be sent to a second CU/PU/TU decision block 318 for comparison. For example, each of the four 16×16 coding units may be one 16×16 unit or four 8×8 units.

Still referring to FIG. 3, the CRE 306 may generate a single 32×32 residual for scoring at the HFTQ 312. The CRE 306 may also receive information from the CU decision block 318 regarding possible 32×32 CUs and make a frequency domain decision of four 32×32 CUs to use to generate four corresponding residuals to send to the HFTQ 312 for generating RDO scores. Specifically, the CRE 306 can derive accurate predicted motion vectors. The predicted motion vectors (MVs) may have many purposes in skip center and cost center applications. In some examples, the CRE 306 can derive predicted MVs based on the previous CU's motion vector. For example, the CRE 306 can derive predicted MVs based on the previous CU's motion vector in the case where the previous CU was based on an inter predicted MV. In cases where a previous CU is based on an intra predicted MV, the CRE 306 can use the selected angle to predict the current CU's intra angle. Thus, the CREs 302-306 may include similar neighbor modes and motion vectors at blocks 324, 330, and 340. However, the difference between processing at blocks 340 and 330 or 324 is that at block 340 takes the feedback after the final decision is made in 318 while 330 and 324 'guess' what 316 will do based on the pre-HFTQ analysis. Thus, four 32×32 coding units may be sent for comparison with a 64×64 coding unit to use as a largest coding unit (LCU).

In some examples, the CRE 314 may perform a skip check on the 64×64 CU, but may not perform any intra-frame motion estimation, fractional motion estimation, or bidirectional motion estimation on the 64×64 CU. Since DCTs may not be supported at a 64×64 resolution, a 64×64 CU will have its residual split into four 32×32 CUs for the purposes of transform and inverse transform only. However, the motion vectors and modes may still apply to the whole 64×64 CU. For example, the 64×64 CU may be skip checked after being received 342 from input 301 and sent 344 to the LCU decision block 320 to be compared against four 32×32 CUs in LCU decision block 320. At block 320, the 64×64 to the best composite 64×64 made up of 32×32 and\or smaller CU. As shown in FIG. 3, the "x4" for arrow 338 means that the four accumulated 32×32 CUs have combined their composite RD-cost for comparison with the RD-cost of the 64×64 candidate of 344. At block 346 a PAK CU object is output. For example, the PAK CU object may include any combination of 8×8, 16×16, 32×32 CU or a 64×64 LCU predicted using any combination of intra-frame prediction, such as angular or DC, or inter-frame prediction, such as skip\merge or unidirectional\bidirectional motion estimation including fractional MV precision.

Each of the rows in FIG. 3 may generate an output at about the same time. Thus, for example, the four 8×8 CU RDO scores from the HFTQ may be received at the CU decision block 316 at about the same time as the HFTQ 310 sends each RDO score for each of the 16×16 CUs. Likewise, the four CUs from the CU decision block 316 may arrive at CU decision block 318 at about the same time as the 32×32 CU RDO score from the HFTQ 312. However, this may not be possible if all possible combinations of skip checks, intra-motion estimation, fractional motion estimation, and bidirectional motion estimation are generated for comparison at CU decision blocks 316, 318, and 320. Therefore, the CREs 302 and 304 may predict approximate RDO scores and use higher predicted scoring CUs to the HFTQs 308 and 310 for actual RDO scoring. The predictions of CREs 302 and 304 indicated by loops 324 and 330 are made before the HFTQs 308 and 310 transform the residuals 322 and 328 from the spatial domain into the frequency domain, and are therefore referred to herein as a spatial domain predictions. By contrast, the CRE 306 can use transformed residuals when generating predictions as indicated by loop 340, which is referred to herein as a frequency domain prediction. In some examples, the CRE 306 can use spatial domain predictions for some CU sizes, while using frequency domain predictions for larger CU sizes, including potentially smaller CU's.

In some examples, the decision dependency in the pipeline 300 may be reconfigurable and able to handle multiple performance modes. For example, numerous dependencies may exist for motion vector and mode prediction amongst CU and PU decisions. Enforcing top-right or top or left dependencies within a LCU or not enforcing such dependencies may affect the depth the encoder can be pipelined. Additionally, many points in the pipeline may include a multitude of candidates to be considered. By increasing or decreasing the number of candidates considered at each of the stages of the pipeline 300, the performance can be adjusted.

In addition, pipeline decision dependency handling may be reconfigurable, thus enabling multiple performance modes. For example, numerous dependencies may exist for motion vector and mode prediction amongst the CU and PU decisions. Enforcing top-right or top or left dependencies within a LCU or not may affect the possible depth of the pipeline 300. In some examples, two or more predictions at loops 324 and 334 may be made in parallel. Additionally, many points in the pipeline 300 include a multitude of candidates to be considered. By increasing or decreasing the number of candidates, the performance can be adjusted.

Figure 4:
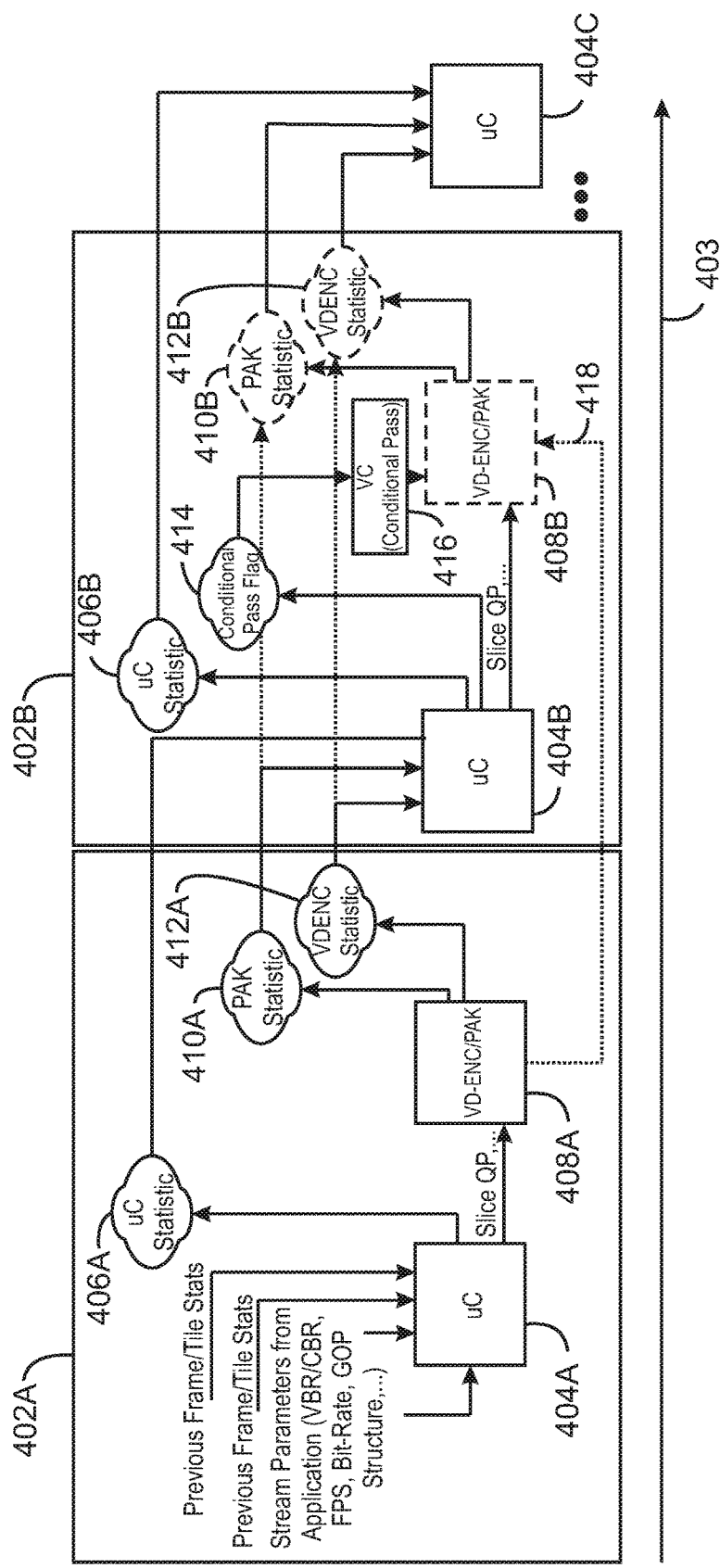
FIG. 4 is a block diagram of collecting statistics via a single pass mode and/or a 2-pass adaptive mode.

FIG. 4 is a block diagram illustrating a method 400 for the collection of statistics via a single pass mode and/or a two-pass adaptive mode. In FIG. 4, a feedback loop based on various statistics is described with a first loop 402A and a second loop 402B. For example, the first loop 402A may represent a frame or tile pass. An arrow 403 illustrates the progression of time from the loop 402A, to the loop 402B. While only two loops are described, the present techniques may execute any number of loops to converge on the best encoder mode decision for the particular media content. At block 404A, a microcontroller takes as inputs controls such as previous frame or tile statistics and stream parameters, such as variable bit rate (VBR), constant bit rate (CBR), frames per second (FPS), bit rate, group of pictures (GOP) structure, and the like. Using this information, the microcontroller at 404A may determine a microcontroller statistic 406A. The microcontroller at 404A also sends a slice QP to the encoder/bit backing at block 408A. Each slice QP is a self-sustained unit of compressed video data and has no dependency with its neighbors. A quantization parameter may be associated with each slice.

Those controls are accepted by the hardware, which performs its task all the way down to the bit stream generation at the encoder/bit backing at block 408A. While the encoder/bit backing at block 408A generates the encoded bit stream, statistics are also generated. Some statistics are generated during the encode (ENC) part of the process at block 412A, and some are generated from the PAK process at block 410A.

In embodiments, the statistics stored during the first loop are stored in memory such that the second time the microcontroller 404 iterates at loop 402B, the microcontroller statistics 406A, PAK statistics 410A, and encoder statistics 412A will be used by the microcontroller 404B at the second loop to set a conditional pass flag at 414. Thus, in embodiments, the microcontroller statistics 406A and 406B include information about the rate control accuracy such as how the rate control buffer is being managed and whether or not the encoding process is accurately meeting predetermined budgets. This information is propagated forward as the latest up-to-date rate control information.

Further, the sliceQP output by the microcontroller 404 may be used to determine if a conditional pass occurs. The conditional pass at block 416 is a portion of the hardware and is used to determine whether or not the conditional pass flag at 414 has been written to or not due to the encoder mode selection that occurred in the first loop 402A meeting all requirements that are needed when the first loop was executed. If all requirements were met in the first loop 402A, the second loop 402B checks to ensure that everything met the requirements. If so, then the conditional pass flag will be set at 414, and a conditional pass performed at block 416, with no need to do any additional tasks.

In embodiments, a conditional multi-pass method includes a single pass mode 402 and a two-pass adaptive mode. During the coding process, a multi-format encode/decode engine may provide a hardware-accelerated media data encode and decode. In particular, each pass may be executed by fixed function hardware-accelerated media data encode and decode components. In embodiments, the encode/decode engine is a stateless engine in that it does not retain any history of settings (states) for the encoding/decoding process of an image. Hence, a driver issues a full set of a state command sequences prior to processing each new frame or tile.

On the other hand, if the encoder mode decisions at the end of the first loop 402A exceeded the criteria and the budgets that were set forth, then the second loop 402B can detect the violation and update the statistics at blocks 406B, 410B, and 412B. Moreover, the conditional flag 414 would be marked as needing to repeat processing of the current frame or tile. In embodiments, the sliceQP parameter is modified to bring the encoder mode decisions within the target budget. The controls of the second loop 402B would be different than the controls specified by 402A, because if the exact controls were used the same exact encoder mode decisions would result in the same decisions, which would not meet the requirements.

Put another way, if the first loop 402A generates a frame or tile that is outside of budget requirements in any other way, then the sliceQP can be set by the second loop 402B to make the next attempt result in a frame or tile size within the particular encoding requirements. When the second loop 402B is executed, a new round of statistics for the PAK 410B and ENC 412B are obtained that negate and overwrite the statistics at block 410A and 412A from the first loop 402A. Thus, the ENC/PAK 408B, PAK statistic 410B and ENC statistic 412B are represented with dashed lines, as they are optional steps based on results from the previous loop 402A. While the sliceQP is used as an exemplary control, any control may be used to bring the target frame or tile within requirement dictated by a particular encoding scheme. The controls, may be for example, sliceQP or any other mode costing. In embodiments, a threshold may be a control that will dynamically control the hardware throughput by reducing the pipelining, which in turn increases the accuracy of the mode decision boundary or skip. In some examples, PAK-only multi-pass encoding may be performed as indicated by an arrow 418. For example, in response to detecting a frame QP change that is less than a first threshold and higher than a second threshold, then the PAK may repack a frame using an updated QP parameter without using the HME, IME, or CRE.

Figure 5:
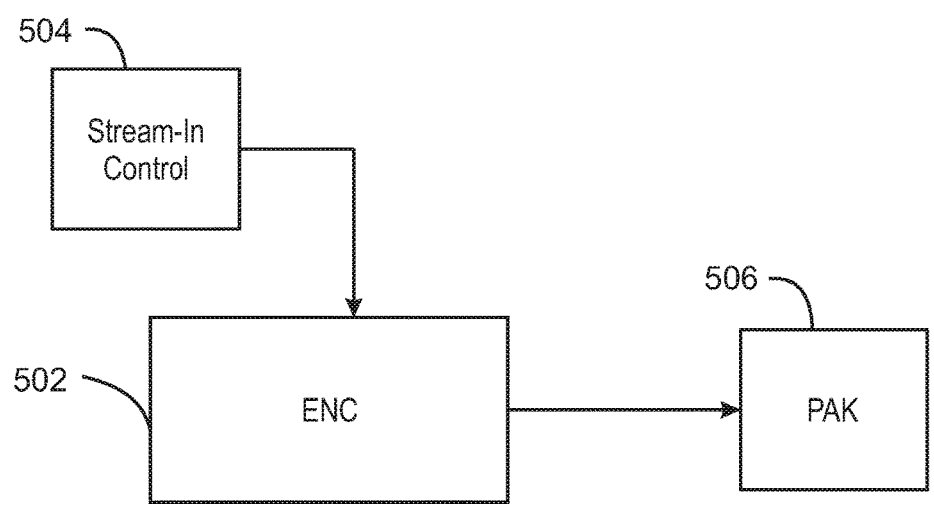
FIG. 5 is a diagram illustrating an example black box encoder.

FIG. 5 is an illustration of a hardware encoder 502. Stream in control 504 is provided to the encoder. The hardware encoder as described herein may be a black-box wherein an external process such as a software driver or microcontroller extends the capabilities of the encoder via costings, special hints, or controls the hardware encoder will honor. The stream-in control 504 is similar to costings and enables a third party process to bias and control every individual coding unit. The stream-in control can be applied to each function, similar to the costings described in FIG. 2. For example, one of the stream-in controls might force the intra-search as the best mode decision. In some cases, an additional search candidate can be provided via a third search, an importance rank (region of interest) can be specified, the mode decision can be forced to skip, intra-predict or let the hardware decide, the QP (quantization parameter) can be forced, or other rate control parameters applied to the encoding process.

In embodiments, a pointer may be generated by an external process and provided to the encoder 502. Overrides (costings, special hints, or controls) such as an additional IME search predictor may also be used. In embodiments, a third IME search center x, y (beyond HME and PPMV) may be provided. This enables an even larger search range. Additionally, a region of interest control may also be provided for dynamic CU QP adjustments. Moreover, a force type may be skip, intra, or let the encoder decide. A force QP may be used, or the encoder may determine the QP. Additionally, rate control panic controls may be used. As described above, HEVC enables variable sized coding units. In some examples, specific control may be implemented in an external process by selecting 32×32 based control and having the encoder 502 align the 32×32 based control with the chosen CU tree for the 32×32. For example, if the chosen tree is 4×16×16 for that 32×32, then the external stream-in control 504 can be applied to each 16×16 coding unit. Thus, the 'grid' known to an external process may not be 1:1 with the 'grid' selected by the encoder 502. Therefore, the dynamic stream-in granularity may be handled by the encoder 502.

In some cases, the user can provide bit budget thresholds for which each slice is targeting to not exceed. Because the hardware encoder is pipelined for performance, there may be some feedback delay from where the bits are accumulated to where the encoder makes important slice termination calculations. The user can specify one threshold which dynamically will slow the hardware by reducing the pipelining which increases the accuracy of the slice termination boundary or the user can skip that threshold which will increase performance but decrease the precision of the slice termination behavior.

Figure 6:
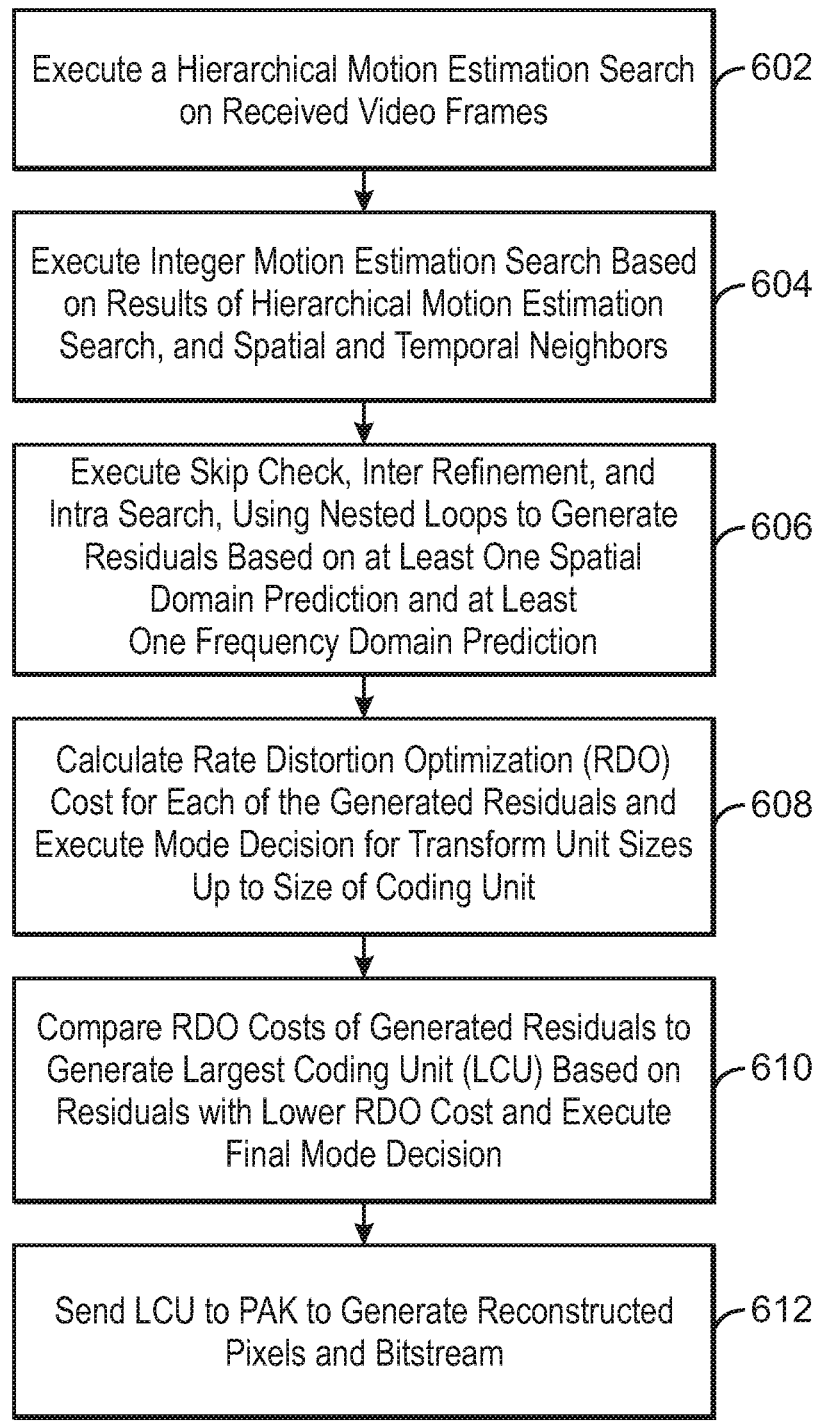
FIG. 6 is a process flow diagram of an example method for hardware video encoding.

FIG. 6 is a process flow diagram of a method 600 to enable hardware encoding. The example process is generally referred to by the reference number 200 and can be implemented in the system 100 above or the electronic device 700 below.

At block 602, a hierarchical motion estimation search is performed on two received video frames. In embodiments, the hierarchal motion estimation search is performed using downscaled references. For example, each largest coding unit (LCU) (64×64) of each video frame can be downscaled to 8×8 blocks and searched at $\frac{1}{8}^{th}$ resolution. Results may then be provided to $\frac{1}{4}^{th}$ resolution search stage. Finally, a list of candidates may be generated for a 1× resolution IME for each 32×32 CU of the 64×64 LCU. This may be done as 64×64 to ensure the 8× downsampled 8×8 is large enough to have enough features to track small to medium sized objects, as opposed to using 32×32 downscaled by 8× and searching for 4×4 matches. The list of 1×IME candidates may include spatial neighbors, HME derived predictors, temporal predictors, and user-provided predictors. In some examples, the number of predictors used by the IME may be based on a performance mode. For example, in a high performance mode, the IME may choose 12 predictors from a set of predictors. In a lower performance mode, the IME may use only four predictors. In some examples, the predictors may be sorted based on a predefined ranking list that assigns each predictor a priority number. For example, higher priority predictors may be selected based on priority number if a subset of predictors is used. In some examples, redundant predictors may be detected using a search center distance parameter that may be used to analyze overlap between predictors. If a predictor is redundant with respect to a predictor that was already used for a search, then the redundant predictor may be dropped and a predictor with a next higher priority number may be used. In some examples, the amount of overlap used to determine redundancy may be a programmable threshold.

As described above, recursive codecs such as HEVC and VP9 may use video formats with 10 bits or even 12 bits of precision. In some examples, the ten bit or twelve bit blocks of the video frames may be truncated into eight bit most significant bit (MSB) blocks for performing the motion estimation. For example, the video frames may be formatted with 10 bits or 12 bits of precision. Support may thus be provided for 4:2:2 and 4:4:4 chroma formats with 10 bits and 12 bits of precision optimally for compression and bandwidth based on 4:2:0 8 bit fundamental building blocks. For example, the 4:4:4 and 4:2:2 video frames can be downsampled to 4:2:0 at the entry of the encoder to do motion estimation and mode decision while continuing to preserve the original 4:4:4 or 4:2:2 input for actual reconstruction and binzarization in PAK. In particular, the 10 bit and 12 bit input can be truncated to the 8 bit MSB in the source and the reconstructed image can be written to memory in a split format sending the 8 bit MSB to one region of memory with the 2 bits or 4 bits of least significant bits (LSB) to another region of memory. This may allow the motion estimation to use only the 8 most significant bits (MSB) for searching while the 10 bit and 12 bit original values can be used in the motion compensation of PAK. Using only the 8 MSB may substantially reduce bandwidth and increase quality on noisy content.

At block 604, an integer motion estimation (IME) search is executed based on the results of the hierarchical motion estimation search. The result of the 32×32 IME may be a list of 49 square and rectangle shapes subdividing the 32×32 into various coding unit (CU) and prediction unit (PU) combinations. Those results undergo fractional and bidirectional improvements. In some examples, the IME search may include the use of spatial and temporal neighbor predictors.

At block 606, a check and refinement may be executed using nested loops to generate residuals based on at least one spatial domain prediction and at least one frequency domain prediction. The CRE nested loop can process CUs in a bottom-up fashion resolving each 8×8 first then comparing 4×8×8 vs 1×16×16, then 4×16×16 vs 1×32×32, lastly 4×32×32 vs 1×64×64, as described in greater detail with respect to FIG. 3 above. In some examples, each of the nested loops can be a CU tree of multiple depths up to the level described and the levels beneath. For example, if the 4×8×8 has a lower RDO cost than the 1×16×16, then that 4×8×8 would be considered as the 1×16×16 for larger comparisons with 4×16×16 groupings. In some examples, merge tapering may be used for additional candidate generation. For example, while executing the skip (merge) processing of a given CU level, partial results can be saved and re-used as lower level CU inter candidates. The lower level CU inter candidates may then be AMVP coded rather than merge coded. In some examples, LCU based neighbor reconstruction may be used for improved performance. For example, top row and left LCU edge pixels can be reconstructed and fed back from PAK to provide more accurate intra prediction without substantially affecting hardware complexity due to the 32×32 Z-pattern walk within a 64×64 LCU.

At block 608, a rate distortion optimization (RDO) cost is calculated for each of the generated residuals a mode decision is executed for transform unit sizes up to a size of a coding unit. For example, each of the generated residuals may be transformed into the frequency domain via a discrete cosine transformation and then quantized.

In some examples, a residual flatness check (RFC) may be performed in order to prevent large transform unit (TU) artifacts from appearing in rendered video frames. For example, such artifacts may appear in the form of ringing artifacts in rendered video frames. Sample adaptive offset filters (SAO) may be used as de-ringing filters to correct for such ringing. However, SAO filters may be processor intensive, may add complexity, or may be disabled or not remove all artifacts. Therefore, in some examples, prior to forward transformation of the residual error between the source and the prediction, the RFC can compute the relative distribution of residual throughout a CU and determine if the residual is evenly present or concentrated in a single quadrant. If one quadrant has too much residual or too little residual, the large transform can be blocked by forcing a transform unit (TU) split reducing the likelihood of a visual artifact when SAO is not enabled. A TU split, as used herein, refers to a decision to make a TU smaller than the CU. An encoder may decide to use either a 4×4, 8×8, 16×16 or 32×32 transform for any given CU that is of 32×32 size or larger. For example, a 32×32 CU or 64×64 LCU could use any transform size it likes, but an 8×8 CU can use only 4×4 or 8×8 transform. In some examples, the CRE can prepare RDO cost for TU sizes equal to and smaller than the CU size associated with them at blocks 312, 310, and 308. The best TU split option may then be sent to 320, 318, and 316, respectively. In some examples, the residual flatness check may be based on an adjustable threshold, providing additional flexibility over SAO filters. Moreover, the residual flatness check may also work in conjunction with traditional SAO filters to provide additional quality improvements. For example, the threshold may be set lower to a more aggressive level if an SAO filter is present and enabled.

In addition, a variable intra refresh period with guardband protection may be provided to ensure that an SAO filter uses safe pixels. As used herein, a guardband refers to a pixel region beyond the intra refresh area where filter sampling effects could affect the area outside of the intra refresh area such as SAO. In particular, a guardband is a number of pixels outside the refresh area to protect from corrupted artifacts from spreading in corner cases. For example, both horizontal and vertical refresh patterns may be each provided with protection of prediction across a safe refresh threshold, and a guardband added for loop filter and SAO error propagation.

In some examples, the CRE can make per CU QP adjustments based on motion length. For example, motion can be classified as static, low motion and high motion. In some examples, an additional motion length stage can be included to provide an additional delta QP adjustment. For example, the human visual system may more sensitive to artifacts on static objects than objects with high motion. Thus, the QP can be decreased and increased in the PAK MB object to blur details and enhance them, respectively. In this manner, additional bits can be saved in areas where the human visual system may be less sensitive.

In some examples, QP adjustments may be made based on a weighted prediction parameter. For example, a histogram of luminance data may be provided to a microcontroller for detecting fade-in or fade-out events. The microcontroller may generate a weighted prediction parameter in response to detecting a fade-in event or a fade-out event between frames based on the histogram of luminance data.

At block 610, the RDO costs of the generated residuals may be compared to generate a largest coding unit (LCU) based on residuals with a lower RDO cost and a final mode decision is executed. For example, while the IME and CRE may use Sum of Absolute Transform Distortion (SATD) for the decision criteria, a final mode decision may be based on RDO estimated sum of square errors (SSE) of the reconstructed block (distortion) along with the estimated bit cost based on the number of non-zero coefficients, their magnitudes, and their frequencies. The generated LCU may then be sent to the PAK to be used to encode a 32×32 or 64×64 portion of a video frame at the PAK based on the generated LCU.

At block 612, the LCU is sent to a PAK to generate reconstructed pixels and a bitstream. The LCU may correspond to a portion of an image to be reconstructed and stored locally. The reconstructed image can used by the IME during encoding of the next frame. For example, the IME can perform motion estimation on the reconstructed pixels. The bitstream can be sent to a display device.

This process flow diagram is not intended to indicate that the blocks of the example method 600 are to be executed in any particular order, or that all of the blocks are to be included in every case. Further, any number of additional blocks not shown may be included within the example method 600, depending on the details of the specific implementation. For example, the method 600 may also include receiving a performance mode. In some examples, a number of candidates considered for motion estimation can be increased or decreased based on the performance mode. In some examples, a number of angles considered for motion estimation can be increased or decreased based on the performance mode. In some examples, a number of predictors considered for integer motion estimation can be increased or decreased based on the performance mode.

Figure 7:
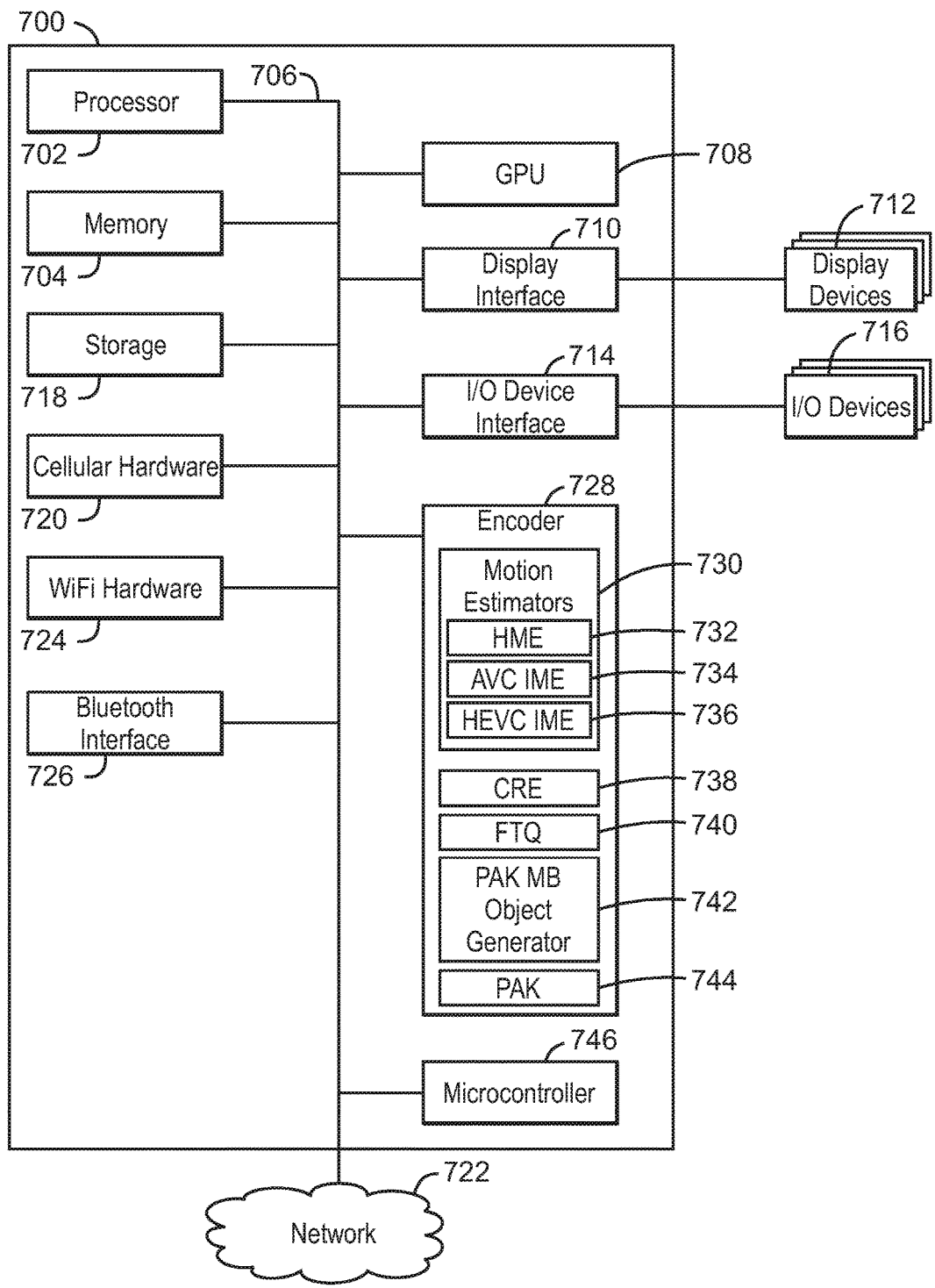
FIG. 7 is a block diagram illustrating an example electronic device that enables hardware video encoding.

FIG. 7 is a block diagram of an electronic device 700 that enables hardware video encoding. The electronic device 700 may be, for example, a server, laptop computer, tablet computer, mobile phone, smart phone, or a wearable device, drone, among others. The electronic device 700 may include a central processing unit (CPU) 702 that is configured to execute stored instructions, as well as a memory device 704 that stores instructions that are executable by the CPU 702. The CPU may be coupled to the memory device 704 by a bus 706. Additionally, the CPU 702 can be a single core processor, a multi-core processor, a computing cluster, or any number of other configurations. Furthermore, the electronic device 700 may include more than one CPU 702. The memory device 704 can include random access memory (RAM), read only memory (ROM), flash memory, or any other suitable memory systems. For example, the memory device 704 may include dynamic random access memory (DRAM).

The electronic device 700 also includes a graphics processing unit (GPU) 708. As shown, the CPU 702 can be coupled through the bus 706 to the GPU 708. The GPU 708 can be configured to perform any number of graphics operations within the electronic device 700. For example, the GPU 708 can be configured to render or manipulate graphics images, graphics frames, videos, or the like, to be displayed to a user of the electronic device 700. In some embodiments, the GPU 708 includes a number of graphics engines, wherein each graphics engine is configured to perform specific graphics tasks, or to execute specific types of workloads. For example, the GPU 708 may include an engine that processes video data via lossless pixel compression.

The CPU 702 can be linked through the bus 706 to a display interface 710 configured to connect the electronic device 700 to a plurality of display devices 712. The display devices 712 can include a display screen that is a built-in component of the electronic device 700. The display devices 712 can also include a computer monitor, television, or projector, among others, that is externally connected to the electronic device 700.

The CPU 702 can also be connected through the bus 706 to an input/output (I/O) device interface 714 configured to connect the electronic device 700 to one or more I/O devices 716. The I/O devices 716 can include, for example, a keyboard and a pointing device, wherein the pointing device can include a touchpad or a touchscreen, among others. The I/O devices 716 can be built-in components of the electronic device 700, or can be devices that are externally connected to the electronic device 700.

The electronic device may also include a storage device 718. The storage device 718 is a physical memory such as a hard drive, an optical drive, a flash drive, an array of drives, or any combinations thereof. The storage device 718 can store user data, such as audio files, video files, audio/video files, and picture files, among others. The storage device 718 can also store programming code such as device drivers, software applications, operating systems, and the like. The programming code stored to the storage device 718 may be executed by the CPU 702, GPU 708, or any other processors that may be included in the electronic device 700.

The CPU 702 may be linked through the bus 706 to cellular hardware 720. The cellular hardware 720 may be any cellular technology, for example, the 4G standard (International Mobile Telecommunications-Advanced (IMT-Advanced) Standard promulgated by the International Telecommunications Union-Radio communication Sector (ITU-R)). In this manner, the electronic device 700 may access any network 722 without being tethered or paired to another device, where the network 722 is a cellular network.

The CPU 702 may also be linked through the bus 706 to WiFi hardware 724. The WiFi hardware is hardware according to WiFi standards (standards promulgated as Institute of Electrical and Electronics Engineers' (IEEE) 802.11 standards). The WiFi hardware 724 enables the electronic device 700 to connect to the Internet using the Transmission Control Protocol and the Internet Protocol (TCP/IP), where the network 722 is the Internet. Accordingly, the electronic device 700 can enable end-to-end connectivity with the Internet by addressing, routing, transmitting, and receiving data according to the TCP/IP protocol without the use of another device. Additionally, a Bluetooth Interface 726 may be coupled to the CPU 702 through the bus 706. The Bluetooth Interface 726 is an interface according to Bluetooth networks (based on the Bluetooth standard promulgated by the Bluetooth Special Interest Group). The Bluetooth Interface 726 enables the electronic device 700 to be paired with other Bluetooth enabled devices through a personal area network (PAN). Accordingly, the network 722 may be a PAN. Examples of Bluetooth enabled devices include a laptop computer, desktop computer, Ultrabook, tablet computer, mobile device, or server, among others.

The computing device 700 may include an encoder 728. The encoder 728 may be a hardware encoder without programmable engines executing within the main loop of an encoder algorithm. In embodiments, this may be referred to as fixed function encoding. Generally, coding video data includes encoding the video to meet proper formats and specifications for recording and playback. The motion estimators 730 may be an algorithms executed by fixed function hardware of the encoder 728. Motion estimation is an important and computationally intensive task in video coding and video compression. In some examples, the motion estimators 730 may include an HME 732, an AVC IME 734, and an HEVC IME 736. For example, the HME 732 may perform a coarser grained search as described above. Parameters such as multi-pass packing (PAK) parameters may calculated based on a target size or bit rate by a PAK module 732. In embodiments, the encoder can be used in an iterative fashion to enable conditional multi-pass encoding. For example, the encoder may use tile or frame based repetition.

The electronic device 700 further includes a check and refinement (CRE) module 738. The CRE 328 may generate residuals based on one or more predictions. The electronic device 700 also includes a forward transform and quantizer (FTQ) 740 to transform the residuals into the frequency domain and quantize the residuals. The FTQ 740 may then calculate RDO costs for the residuals. The electronic device 700 also includes a PAK MB object generator 742 to make a final mode decision for generating an LCU and generate a PAK MB object to send to the PAK 744 for using to encode a frame. For example, the PAK MB object may include a combination of CU sizes and estimation types. The electronic thus includes a PAK 744 to encode a video frame using the received PAK MB object.

The electronic device 700 also includes a microcontroller 746. The microcontroller 746 may process information that is used to override functions of the encoder 728 or the PAK 744. This override may be enabled through costings and other statistics as described above. For example, the microcontroller 746 may be provided a histogram of luminance data for analysis and comparison with previous frames to determine in a fade-in or a fade-out event is occurring. In some examples, the histogram for each of two frames may be converted using a cumulative distribution function and an offset between the resulting curves may be used to determine a weight factor. The microcontroller 746 may compute average luminance difference between frames and generate a weighted prediction parameter to normalize variation in luminance in prediction of motion vectors. In some examples, the weighted prediction parameter may be included in a bit stream sent to a decoder so that the decoder may apply the same weight factor to accurately decode video frames.

The block diagram of FIG. 7 is not intended to indicate that the electronic device 700 is to include all of the components shown in FIG. 7. Rather, the computing system 700 can include fewer or additional components not illustrated in FIG. 7 (e.g., sensors, power management integrated circuits, additional network interfaces, etc.). The electronic device 700 may include any number of additional components not shown in FIG. 7, depending on the details of the specific implementation. Furthermore, any of the functionalities of the CPU 702 may be partially, or entirely, implemented in hardware and/or in a processor. For example, the functionality may be implemented with an application specific integrated circuit, in logic implemented in a processor, in logic implemented in a specialized graphics processing unit, or in any other device.

Figure 8:
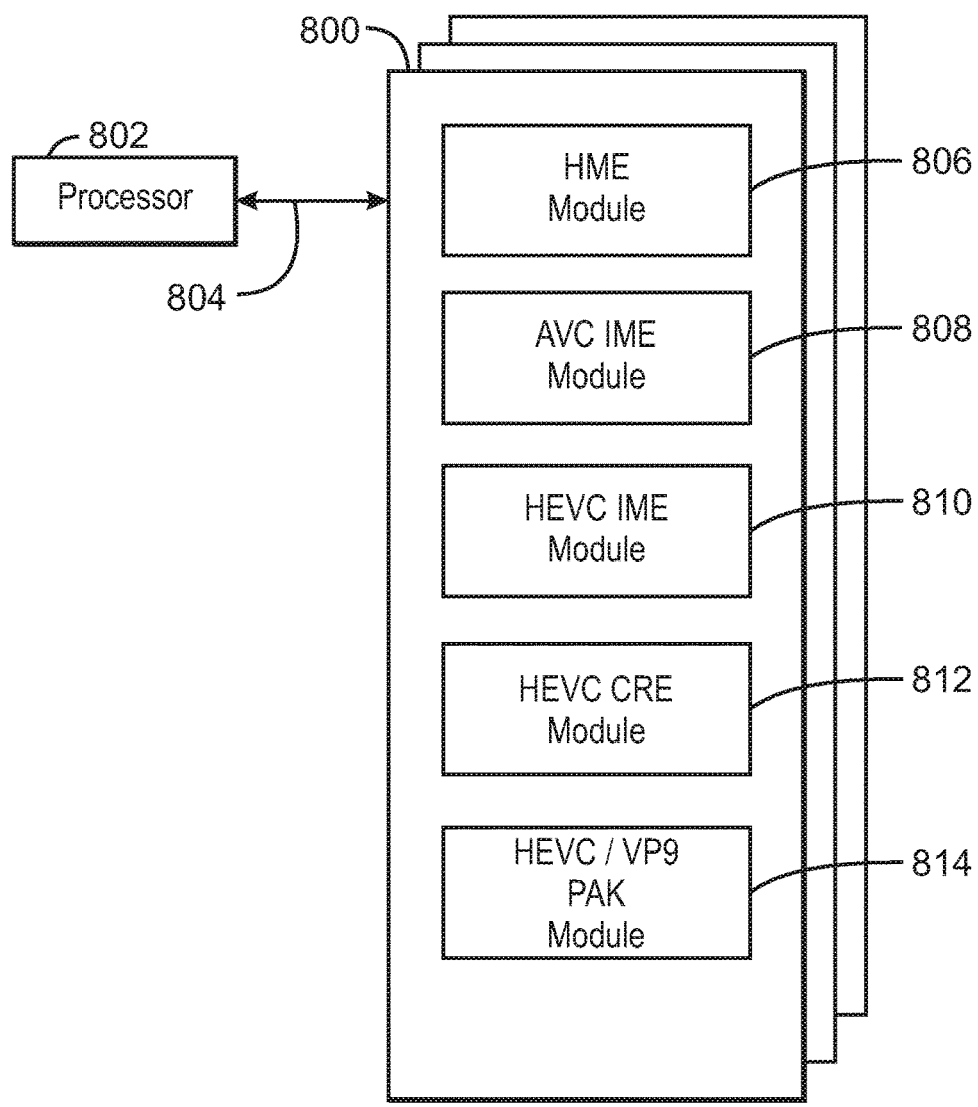
FIG. 8 is a block diagram showing an example medium that contains logic for hardware video encoding.

FIG. 8 is a block diagram showing a medium 800 that contains logic for hardware video encoding. The medium 800 may be a computer-readable medium, including a non-transitory medium that stores code that can be accessed by a processor 802 over a computer bus 804. For example, the computer-readable medium 800 can be volatile or non-volatile data storage device. The medium 800 can also be a logic unit, such as an Application Specific Integrated Circuit (ASIC), a Field Programmable Gate Array (FPGA), or an arrangement of logic gates implemented in one or more integrated circuits, for example.

The medium 800 may include modules 806-814 configured to perform the techniques described herein. For example, an HME module 806 may be configured to determine an encoding mode based on a downscaled motion estimation search. An AVC IME module 808 may be configured to execute an IME search. For example, the IME search may be based on the results of the dual HME search. An HEVC IME module 810 may perform a second IME search based on the results of the first IME search. An HEVC CRE module 812 may determine coding units and corresponding encoder modes in which to encode frames of video. Finally, at block 814, a HEVC/VP9 PAK module packs bits into packets corresponding to the encoder mode decision for consumption by a consumer. For example, the packets may be sent to a decoder to unpack the packets into video frames.

The block diagram of FIG. 8 is not intended to indicate that the medium 800 is to include all of the components shown in FIG. 8. Further, the medium 800 may include any number of additional components not shown in FIG. 8, depending on the details of the specific implementation.

Encoder algorithms must reduce a practically unlimited number of syntax and tool combinations defined by a specification into a single option that all decoders are able to understand. The present techniques result in an option that uses the least amount of power, or provides the most amount of video fidelity, or the most amount of compression, or some combination of these metrics. In embodiments, the present techniques focus on video compression at 4K resolution in low power with subjective video quality enhancements.

EXAMPLES

Example 1 is a system for video encoding. The system includes an encoder including a plurality of fixed function hardware units including a hierarchical motion estimation unit, an integer motion estimation unit, and a check and refinement unit. When the encoder is to execute the plurality of fixed function hardware units, the plurality of fixed function hardware units are operable to execute a hierarchical motion estimation search. The plurality of fixed function hardware units are operable to execute an integer motion estimation search based on at least the results of the hierarchical motion estimation (HME) search, and spatial and temporal neighbors. The plurality of fixed function hardware units are operable to execute a skip check, an inter refinement, and an intra search, using nested loops to generate residuals based on at least one spatial domain prediction and at least one frequency domain prediction. The plurality of fixed function hardware units are operable to calculate a rate distortion optimization (RDO) cost for each of the generated residuals and execute a mode decision for transform unit sizes up to a size of a coding unit. The plurality of fixed function hardware units are operable to generate a largest coding unit (LCU) based on rate distortion optimization (RDO) cost comparisons of the generated residuals and execute a final mode decision.

Example 2 includes the system of example 1, including or excluding optional features. In this example, the system includes a memory that is to store instructions and that is communicatively coupled to the encoder; and a processor communicatively coupled to the encoder and the memory, wherein when the processor is to execute the instructions, the processor is to receive statistics including a sum of square error (SSE) classifier cube and adjust a prediction parameter for future frames or a current frame based on the SSE classifier cube.

Example 3 includes the system of any one of examples 1 to 2, including or excluding optional features. In this example, the system includes a FTQ to transform the residuals into the frequency domain and quantize the residuals.

Example 4 includes the system of any one of examples 1 to 3, including or excluding optional features. In this example, the check and refinement unit includes a tree-based recursive pipeline. At least one layer of the tree-based recursive pipeline is to perform the frequency domain prediction and at least one layer of the pipeline is to perform the spatial domain prediction in parallel.

Example 5 includes the system of any one of examples 1 to 4, including or excluding optional features. In this example, the system includes a microcontroller to generate a weighted prediction parameter based on a histogram of luminance data in response to detecting a fade-in or a fade-out event between the two received video frames.

Example 6 includes the system of any one of examples 1 to 5, including or excluding optional features. In this example, the system includes a microcontroller to receive a sum of square error classifier cube from a PAK and cause the PAK to reencode a frame in response to detecting an error exceeding a threshold.

Example 7 includes the system of any one of examples 1 to 6, including or excluding optional features. In this example, the system includes a microcontroller to receive a sum of square error classifier cube from a PAK and adjust a prediction parameter for future frame to be encoded with less error response to detecting an error exceeding a first threshold and less than a second threshold.

Example 8 includes the system of any one of examples 1 to 7, including or excluding optional features. In this example, the system includes a microcontroller to specify an adjustment value for a per-coding unit quantization parameter adjustment based on motion vector length.

Example 9 includes the system of any one of examples 1 to 8, including or excluding optional features. In this example, the system includes a memory including a tile-width cache.

Example 10 includes the system of any one of examples 1 to 9, including or excluding optional features. In this example, the system includes a memory to store video frames in a split format based on eight bit building blocks.

Example 11 is a method for hardware video encoding. The method includes executing a hierarchical motion estimation search on two received video frames. The method also includes executing an integer motion estimation search based on at least the results of the hierarchical motion estimation (HME) search and spatial and temporal neighbors. The method further includes executing a skip check, an inter refinement, and an intra search, using nested loops to generate residuals based on at least one spatial domain prediction and at least one frequency domain prediction. The method also include calculating a rate distortion optimization (RDO) cost for each of the generated residuals and executing a mode decision for transform unit sizes up to a size of a coding unit. The method also further includes comparing the RDO costs of the generated residuals to generate a largest coding unit (LCU) based on residuals with a lower RDO cost and executing a final mode decision.

Example 12 includes the method of example 11, including or excluding optional features. In this example, the method includes saving partial results from processing a particular coding unit level and using the partial results as lower level coding unit inter candidates.

Example 13 includes the method of any one of examples 11 to 12, including or excluding optional features. In this example, the method includes reconstructing top row and left edge LCU pixels at a PAK, and using the reconstructed LCU pixels in the check and refinement to increase intra prediction accuracy.

Example 14 includes the method of any one of examples 11 to 13, including or excluding optional features. In this example, the method includes performing a residual flatness check to force a transform unit split in response to detecting that one of the generated residuals includes a relative distribution that is concentrated in a single quadrant.

Example 15 includes the method of any one of examples 11 to 14, including or excluding optional features. In this example, the method includes executing a per-coding unit quantization parameter adjustment based on motion vector length.

Example 16 includes the method of any one of examples 11 to 15, including or excluding optional features. In this example, the method includes generating a weighted prediction parameter, via a microcontroller, based on a histogram of luminance data in response to detecting a fade-in or a fade-out event between the two received video frames.

Example 17 includes the method of any one of examples 11 to 16, including or excluding optional features. In this example, the method includes truncating ten bit or twelve bit blocks of the video frames into eight bit most significant bit (MSB) blocks for performing the motion estimation.

Example 18 includes the method of any one of examples 11 to 17, including or excluding optional features. In this example, the method includes increasing or decreasing a number of candidates considered for motion estimation, a number of angles considered for motion estimation, or a number of predictors considered for integer motion estimation, based on a performance mode.

Example 19 includes the method of any one of examples 11 to 18, including or excluding optional features. In this example, generating the residuals, calculating the RDO costs, and comparing the RDO costs of the generated residuals are performed in parallel using a recursive tree-based pipeline.

Example 20 includes the method of any one of examples 11 to 19, including or excluding optional features. In this example, the method includes performing a PAK-only multi-pass in response to detecting a frame QP change that is less than a first threshold and higher than a second threshold.

Example 21 is an apparatus for video encoding. The apparatus includes an encoder including a fixed function hierarchical motion estimation search (HME) unit, fixed function integer motion estimation search (IME) units, and a fixed function check and refinement (CRE) unit. The CRE is to generate residuals using nested loops based on at least one spatial domain prediction and at least one frequency domain prediction and perform a final mode decision based on rate distortion optimization (RDO) costs associated with the generated residuals. The apparatus includes a hardware bit packing (PAK) unit. The PAK unit is to pack bits as coded according to the final mode decision into a data format.

Example 22 includes the apparatus of example 21, including or excluding optional features. In this example, the PAK unit is to perform a PAK only multi-pass in response to detecting a frame QP change that is less than a first threshold and higher than a second threshold.

Example 23 includes the apparatus of any one of examples 21 to 22, including or excluding optional features. In this example, the CRE includes an FTQ to transform the residuals into the frequency domain and quantize the residuals.

Example 24 includes the apparatus of any one of examples 21 to 23, including or excluding optional features. In this example, the PAK is to generate a sum of square error (SSE) classifier cube and send the SSE classifier cube to a microcontroller for QP adjustments.

Example 25 includes the apparatus of any one of examples 21 to 24, including or excluding optional features. In this example, the check and refinement unit includes a pipeline, wherein at least one layer of the pipeline is to perform the frequency domain prediction and at least one layer of the pipeline is to perform the spatial domain prediction.

Example 26 includes the apparatus of any one of examples 21 to 25, including or excluding optional features. In this example, the CRE is to calculate a rate distortion optimization (RDO) cost for each of the generated residuals and execute a mode decision for transform unit sizes up to a size of a coding unit.

Example 27 includes the apparatus of any one of examples 21 to 26, including or excluding optional features. In this example, the CRE is to generate a largest coding unit (LCU) based on rate distortion optimization (RDO) cost comparisons of the generated residuals and execute the final mode decision Example 28 includes the apparatus of any one of examples 21 to 27, including or excluding optional features. In this example, the IMEs are to execute an integer motion estimation search based on at least the results of the hierarchical motion estimation (HME) search, and spatial and temporal neighbors.

Example 29 includes the apparatus of any one of examples 21 to 28, including or excluding optional features. In this example, the CRE is to execute a skip check, an inter refinement, and an intra search, using nested loops to generate residuals based on the at least one spatial domain prediction and the at least one frequency domain prediction.

Example 30 includes the apparatus of any one of examples 21 to 29, including or excluding optional features. In this example, the final mode decision is based on a rate distortion optimization (RDO) estimated sum of square errors (SSE) of the reconstructed block along with the estimated bit cost based on the number of non-zero coefficients, magnitudes of the coefficients, and frequencies of the coefficients.

Example 31 is a system for video encoding. The system includes means for executing a hierarchical motion estimation search. The system also includes means for executing an integer motion estimation search based on at least the results of the hierarchical motion estimation (HME) search, and spatial and temporal neighbors. The system further includes means for executing a skip check, an inter refinement, and an intra search, using nested loops to generate residuals based on at least one spatial domain prediction and at least one frequency domain prediction. The system includes means for calculating a rate distortion optimization (RDO) cost for each of the generated residuals and execute a mode decision for transform unit sizes up to a size of a coding unit. The system further includes means for generating a largest coding unit (LCU) based on rate distortion optimization (RDO) cost comparisons of the generated residuals and execute a final mode decision.

Example 32 includes the system of example 31, including or excluding optional features. In this example, the system includes means for receiving statistics including a sum of square error (SSE) classifier cube and adjusting a prediction parameter for future frames or a current frame based on the SSE classifier cube.

Example 33 includes the system of any one of examples 31 to 32, including or excluding optional features. In this example, the system includes means for transforming the residuals into the frequency domain and quantize the residuals.

Example 34 includes the system of any one of examples 31 to 33, including or excluding optional features. In this example, the means for executing the skip check includes a tree-based recursive pipeline. At least one layer of the tree-based recursive pipeline is to perform the frequency domain prediction and at least one layer of the tree-based recursive pipeline is to perform the spatial domain prediction in parallel.

Example 35 includes the system of any one of examples 31 to 34, including or excluding optional features. In this example, the system includes means for generating a weighted prediction parameter based on a histogram of luminance data in response to detecting a fade-in or a fade-out event between the two received video frames.

Example 36 includes the system of any one of examples 31 to 35, including or excluding optional features. In this example, the system includes means for receiving a sum of square error classifier cube from a PAK and causing the PAK to reencode a frame in response to detecting an error exceeding a threshold.

Example 37 includes the system of any one of examples 31 to 36, including or excluding optional features. In this example, the system includes means for receiving a sum of square error classifier cube from a PAK and adjusting a prediction parameter for future frame to be encoded with less error response to detecting an error exceeding a first threshold and less than a second threshold.

Example 38 includes the system of any one of examples 31 to 37, including or excluding optional features. In this example, the system includes means for specifying an adjustment value for a per-coding unit quantization parameter adjustment based on motion vector length.

Example 39 includes the system of any one of examples 31 to 38, including or excluding optional features. In this example, the system includes a memory including a tile-width cache.

Example 40 includes the system of any one of examples 31 to 39, including or excluding optional features. In this example, the system includes means for storing video frames in a split format based on eight bit building blocks.

Example 41 is at least one computer readable medium for encoding video frames having instructions stored therein that. The computer-readable medium includes instructions that direct the processor to execute a hierarchical motion estimation search on two received video frames. The computer-readable medium also includes instructions that direct the processor to execute an integer motion estimation search based on at least the results of the hierarchical motion estimation (HME) search and spatial and temporal neighbors. The computer-readable medium further includes instructions that direct the processor to execute a skip check, an inter refinement, and an intra search, using nested loops to generate residuals based on at least one spatial domain prediction and at least one frequency domain prediction. The computer-readable medium also further includes instructions that direct the processor to calculate a rate distortion optimization (RDO) cost for each of the generated residuals and execute a mode decision for transform unit sizes up to a size of a coding unit. The computer-readable medium further includes instructions that direct the processor to compare the RDO costs of the generated residuals to generate a largest coding unit (LCU) based on residuals with a lower RDO cost and execute a final mode decision.

Example 42 includes the computer-readable medium of example 41, including or excluding optional features. In this example, the computer-readable medium includes instructions to save partial results from processing a particular coding unit level and using the partial results as lower level coding unit inter candidates.

Example 43 includes the computer-readable medium of any one of examples 41 to 42, including or excluding optional features. In this example, the computer-readable medium includes instructions to reconstruct top row and left edge LCU pixels at a PAK, and use the reconstructed LCU pixels in the check and refinement to increase intra prediction accuracy.

Example 44 includes the computer-readable medium of any one of examples 41 to 43, including or excluding optional features. In this example, the computer-readable medium includes instructions to perform a residual flatness check to force a transform unit split in response to detecting that one of the generated residuals includes a relative distribution that is concentrated in a single quadrant.

Example 45 includes the computer-readable medium of any one of examples 41 to 44, including or excluding optional features. In this example, the computer-readable medium includes instructions to execute a per-coding unit quantization parameter adjustment based on motion vector length.

Example 46 includes the computer-readable medium of any one of examples 41 to 45, including or excluding optional features. In this example, the computer-readable medium includes instructions to generate a weighted prediction parameter, via a microcontroller, based on a histogram of luminance data in response to detecting a fade-in or a fade-out event between the two received video frames.

Example 47 includes the computer-readable medium of any one of examples 41 to 46, including or excluding optional features. In this example, the computer-readable medium includes instructions to truncate ten bit or twelve bit blocks of the video frames into eight bit most significant bit (MSB) blocks for performing the motion estimation.

Example 48 includes the computer-readable medium of any one of examples 41 to 47, including or excluding optional features. In this example, the computer-readable medium includes instructions to increase or decrease a number of candidates considered for motion estimation, a number of angles considered for motion estimation, or a number of predictors considered for integer motion estimation, based on a performance mode.

Example 49 includes the computer-readable medium of any one of examples 41 to 48, including or excluding optional features. In this example, the computer-readable medium includes instructions to generate the residuals, calculate the RDO costs, and compare the RDO costs of the generated residuals in parallel using a recursive tree-based pipeline.

Example 50 includes the computer-readable medium of any one of examples 41 to 49, including or excluding optional features. In this example, the computer-readable medium includes instructions to perform a PAK-only multipass in response to detecting a frame QP change that is less than a first threshold and higher than a second threshold.

It is to be understood that specifics in the aforementioned examples may be used anywhere in one or more embodiments. For instance, all optional features of the electronic device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A system for video encoding, comprising:
an encoder comprising a plurality of fixed function hardware units comprising a hierarchical motion estimation unit, an integer motion estimation unit, and a check and refinement unit, wherein when the encoder is to execute the plurality of fixed function hardware units, wherein the plurality of fixed function hardware units are operable to:
execute a hierarchical motion estimation search;
execute an integer motion estimation search based on at least the results of the hierarchical motion estimation (HME) search, and spatial and temporal neighbors;
execute a skip check, an inter refinement, and an intra search, using nested loops to generate residuals based on at least one spatial domain prediction and at least one frequency domain prediction;
calculate a rate distortion optimization (RDO) cost for each of the generated residuals and execute a mode decision for transform unit sizes up to a size of a coding unit; and
generate a largest coding unit (LCU) based on rate distortion optimization (RDO) cost comparisons of the generated residuals and execute a final mode decision.

2. The system of claim 1, comprising:
a memory that is to store instructions and that is communicatively coupled to the encoder; and
a processor communicatively coupled to the encoder and the memory, wherein when the processor is to execute the instructions, the processor is to receive statistics comprising a sum of square error (SSE) classifier cube and adjust a prediction parameter for future frames or a current frame based on the SSE classifier cube.

3. The system of claim 1, comprising a forward transform and quantization (FTQ) to transform the residuals into the frequency domain and quantize the residuals.

4. The system of claim 1, wherein the check and refinement unit comprises a tree-based recursive pipeline, wherein at least one layer of the tree-based recursive pipeline is to perform the frequency domain prediction and at least one layer of the tree-based recursive pipeline is to perform the spatial domain prediction in parallel.

5. The system of claim 1, comprising a microcontroller to generate a weighted prediction parameter based on a histogram of luminance data in response to detecting a fade-in or a fade-out event between two received video frames.

6. The system of claim 1, comprising a microcontroller to receive a sum of square error classifier cube from a hardware bit packer (PAK) and cause the PAK to reencode a frame in response to detecting an error exceeding a threshold.

7. The system of claim 1, comprising a microcontroller to receive a sum of square error classifier cube from a hardware bit packer (PAK) and adjust a prediction parameter for future frame to be encoded with less error response to detecting an error exceeding a first threshold and less than a second threshold.

8. The system of claim 1, comprising a microcontroller to specify an adjustment value for a per-coding unit quantization parameter adjustment based on motion vector length.

9. The system of claim 1, comprising a memory comprising a tile-width cache.

10. The system of claim 1, comprising a memory to store video frames in a split format based on eight bit building blocks.

11. A method for hardware video encoding, comprising:
executing a hierarchical motion estimation search on two received video frames;
executing an integer motion estimation search based on at least the results of the hierarchical motion estimation (HME) search and spatial and temporal neighbors;
executing a skip check, an inter refinement, and an intra search, using nested loops to generate residuals based on at least one spatial domain prediction and at least one frequency domain prediction;
calculating a rate distortion optimization (RDO) cost for each of the generated residuals and executing a mode decision for transform unit sizes up to a size of a coding unit; and
comparing the RDO costs of the generated residuals to generate a largest coding unit (LCU) based on residuals with a lower RDO cost and executing a final mode decision.

12. The method of claim 11, comprising saving partial results from processing a particular coding unit level and using the partial results as lower level coding unit inter candidates.

13. The method of claim 11, comprising reconstructing top row and left edge LCU pixels at a hardware bit packer (PAK), and using the reconstructed LCU pixels in the check and refinement to increase intra prediction accuracy.

14. The method of claim 11, comprising performing a residual flatness check to force a transform unit split in response to detecting that one of the generated residuals comprises a relative distribution that is concentrated in a single quadrant.

15. The method of claim 11, comprising executing a per-coding unit quantization parameter adjustment based on motion vector length.

16. The method of claim 11, comprising generating a weighted prediction parameter, via a microcontroller, based on a histogram of luminance data in response to detecting a fade-in or a fade-out event between the two received video frames.

17. The method of claim 11, comprising truncating ten bit or twelve bit blocks of the video frames into eight bit most significant bit (MSB) blocks for performing the motion estimation.

18. The method of claim 11, comprising increasing or decreasing a number of candidates considered for motion estimation, a number of angles considered for motion estimation, or a number of predictors considered for integer motion estimation, based on a performance mode.

19. The method of claim 11, wherein generating the residuals, calculating the RDO costs, and comparing the RDO costs of the generated residuals are performed in parallel using a recursive tree-based pipeline.

20. The method of claim 11, comprising performing a hardware bit packing (PAK)-only multi-pass in response to detecting a frame quantization parameter (QP) change that is less than a first threshold and higher than a second threshold.

21. An apparatus for video encoding, comprising:
an encoder comprising a fixed function hierarchical motion estimation search unit, fixed function integer motion estimation search units, and a fixed function check and refinement unit, wherein the check and refinement unit is to generate residuals using nested loops based on at least one spatial domain prediction and at least one frequency domain prediction and perform a final mode decision based on rate distortion optimization (RDO) costs associated with the generated residuals; and
a hardware bit packing (PAK) unit, wherein the hardware bit packing unit is to pack bits as coded according to the final mode decision into a data format.

22. The apparatus of claim 21, wherein the PAK unit is to perform a PAK only multi-pass in response to detecting a frame quantization parameter (QP) change that is less than a first threshold and higher than a second threshold.

23. The apparatus of claim 21, wherein the check and refinement engine (CRE) comprises a forward transform and quantization (FTQ) to transform the residuals into the frequency domain and quantize the residuals.

24. The apparatus of claim 21, wherein the PAK is to generate a sum of square error (SSE) classifier cube and send the SSE classifier cube to a microcontroller for quantization parameter (QP) adjustments.

25. The apparatus of claim 21, wherein the check and refinement unit comprises a pipeline, wherein at least one layer of the pipeline is to perform the frequency domain prediction and at least one layer of the pipeline is to perform the spatial domain prediction.

* * * * *